US012320821B2

(12) United States Patent
Wiederin et al.

(10) Patent No.: US 12,320,821 B2
(45) Date of Patent: Jun. 3, 2025

(54) AUTOSAMPLER SYSTEM WITH AUTOMATED SAMPLE CONTAINER COVER REMOVAL AND SAMPLE PROBE POSITIONING

(71) Applicant: Elemental Scientific, Inc., Omaha, NE (US)

(72) Inventors: Daniel R Wiederin, Omaha, NE (US); Jared Kaser, Fort Collins, CO (US); Beau A. Marth, La Vista, NE (US)

(73) Assignee: Elemental Scientific, Inc., Omaha, NE (US)

( * ) Notice: Subject to any disclaimer, the term of this patent is extended or adjusted under 35 U.S.C. 154(b) by 897 days.

(21) Appl. No.: 17/381,688

(22) Filed: Jul. 21, 2021

(65) Prior Publication Data

US 2021/0349118 A1 Nov. 11, 2021

Related U.S. Application Data

(63) Continuation-in-part of application No. 17/208,136, filed on Mar. 22, 2021, now Pat. No. 11,761,970.
(Continued)

(51) Int. Cl.
*G01N 35/04* (2006.01)
*G01N 35/00* (2006.01)

(52) U.S. Cl.
CPC ... *G01N 35/04* (2013.01); *G01N 2035/00059* (2013.01); *G01N 2035/00287* (2013.01);
(Continued)

(58) Field of Classification Search
CPC ......... G01N 35/04; G01N 2035/00059; G01N 2035/00287; G01N 2035/0405;
(Continued)

(56) References Cited

U.S. PATENT DOCUMENTS 3,847,502 A 11/1974 Isbell
6,161,722 A 12/2000 Sooudi et al.
(Continued)

FOREIGN PATENT DOCUMENTS

EP 0769842 B1 12/1998
JP S58217857 A 12/1983
(Continued)

OTHER PUBLICATIONS

Extended European Search Report for Application No. 21771609.1 dated Apr. 15, 2024.
(Continued)

*Primary Examiner* — John McGuirk
(74) *Attorney, Agent, or Firm* — Kevin E. West; Advent, LLP

(57) ABSTRACT

Systems and methods are described for integrated sample container cover removal and sample probe positioning. In an example implementation, an autosampler system includes, but is not limited to, a z-axis support rotatable about a z-axis of an autosampler deck; a sample probe support structure coupled to the z-axis support, the sample probe support structure configured to hold a sample probe to withdraw a fluid-containing sample held within a sample container supported by the autosampler deck; and a sample cap remover coupled to the z-axis support in an orientation that is rotationally offset from the z-axis support with respect to the sample probe support structure, the sample cap remover configured to lift a cap from the sample container to provide access to an interior of the sample container by the sample probe supported by the sample probe support structure.

19 Claims, 18 Drawing Sheets

Related U.S. Application Data

(60) Provisional application No. 63/057,441, filed on Jul. 28, 2020, provisional application No. 62/992,334, filed on Mar. 20, 2020.

(52) U.S. Cl.
CPC ............... *G01N 2035/0405* (2013.01); *G01N 2035/0441* (2013.01)

(58) Field of Classification Search
CPC ....... G01N 2035/0441; G01N 35/0099; G01N 2035/1086; G01N 35/1083
See application file for complete search history.

(56) References Cited

U.S. PATENT DOCUMENTS

| | | | |
|---|---|---|---|
| 6,537,434 | B1 | 3/2003 | McGrath et al. |
| 7,194,949 | B2 | 3/2007 | Noda |
| 7,201,072 | B1 | 4/2007 | Wiederin et al. |
| 9,046,504 | B2 | 6/2015 | Kanayama |
| 10,335,792 | B2 | 7/2019 | Nuotio et al. |
| 10,514,329 | B1 | 12/2019 | Toms |
| 2001/0013169 | A1 | 8/2001 | Fassbind et al. |
| 2009/0146507 | A1 | 6/2009 | Teramachi et al. |
| 2010/0043211 | A1 | 2/2010 | Pedrazzini |
| 2017/0108523 | A1 | 4/2017 | Van Grinsven |
| 2017/0328927 | A1 | 11/2017 | Wang et al. |
| 2018/0364269 | A1 | 12/2018 | Rose |
| 2020/0033373 | A1 | 1/2020 | Van Grinsven |
| 2020/0319222 | A1* | 10/2020 | VanSickler .......... B25J 19/0025 |

FOREIGN PATENT DOCUMENTS

| | | |
|---|---|---|
| JP | H05126835 A | 5/1993 |
| TW | 202024596 A | 7/2020 |
| WO | 0182013 A1 | 11/2001 |

OTHER PUBLICATIONS

PCT International Search Report and Written Opinion for PCT/US2021/042540, dated Nov. 10, 2021.

Office Action from Japanese Application No. 2022-556261, dated Dec. 24, 2024.

Office Action from Taiwanese Application No. 110127661, dated Feb. 10, 2025.

* cited by examiner

AUTOSAMPLER SYSTEM WITH AUTOMATED SAMPLE CONTAINER COVER REMOVAL AND SAMPLE PROBE POSITIONING

CROSS-REFERENCE TO RELATED APPLICATIONS

The present application is a continuation-in-part under 35 U.S.C. § 120 of U.S. application Ser. No. 17/208,136, filed Mar. 22, 2021, and titled "AUTOSAMPLER RAIL SYSTEM WITH MAGNETIC COUPLING FOR LINEAR MOTION," which in turn claims the benefit under 35 U.S.C. § 119(e) of U.S. Provisional Application Ser. No. 62/992,334, filed Mar. 20, 2020, and titled "AUTOSAMPLER RAIL SYSTEM WITH MAGNETIC COUPLING FOR LINEAR MOTION" and the present application also claims the benefit under 35 U.S.C. § 119(e) of U.S. Provisional Application Ser. No. 63/057,441, filed Jul. 28, 2020, and titled "AUTOSAMPLER SYSTEM WITH AUTOMATED SAMPLE CONTAINER COVER REMOVAL AND SAMPLE PROBE POSITIONING." U.S. Provisional Application Ser. Nos. 62/992,334 and 63/057,441 and U.S. application Ser. No. 17/208,136 are each herein incorporated by reference in its entirety.

BACKGROUND

In many laboratory settings, it is often necessary to analyze a large number of chemical or biochemical samples located in individual sample containers. In order to streamline such processes, the manipulation of samples has been mechanized. Such mechanized sampling is commonly referred to as autosampling and is performed using an automated sampling device or autosampler.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
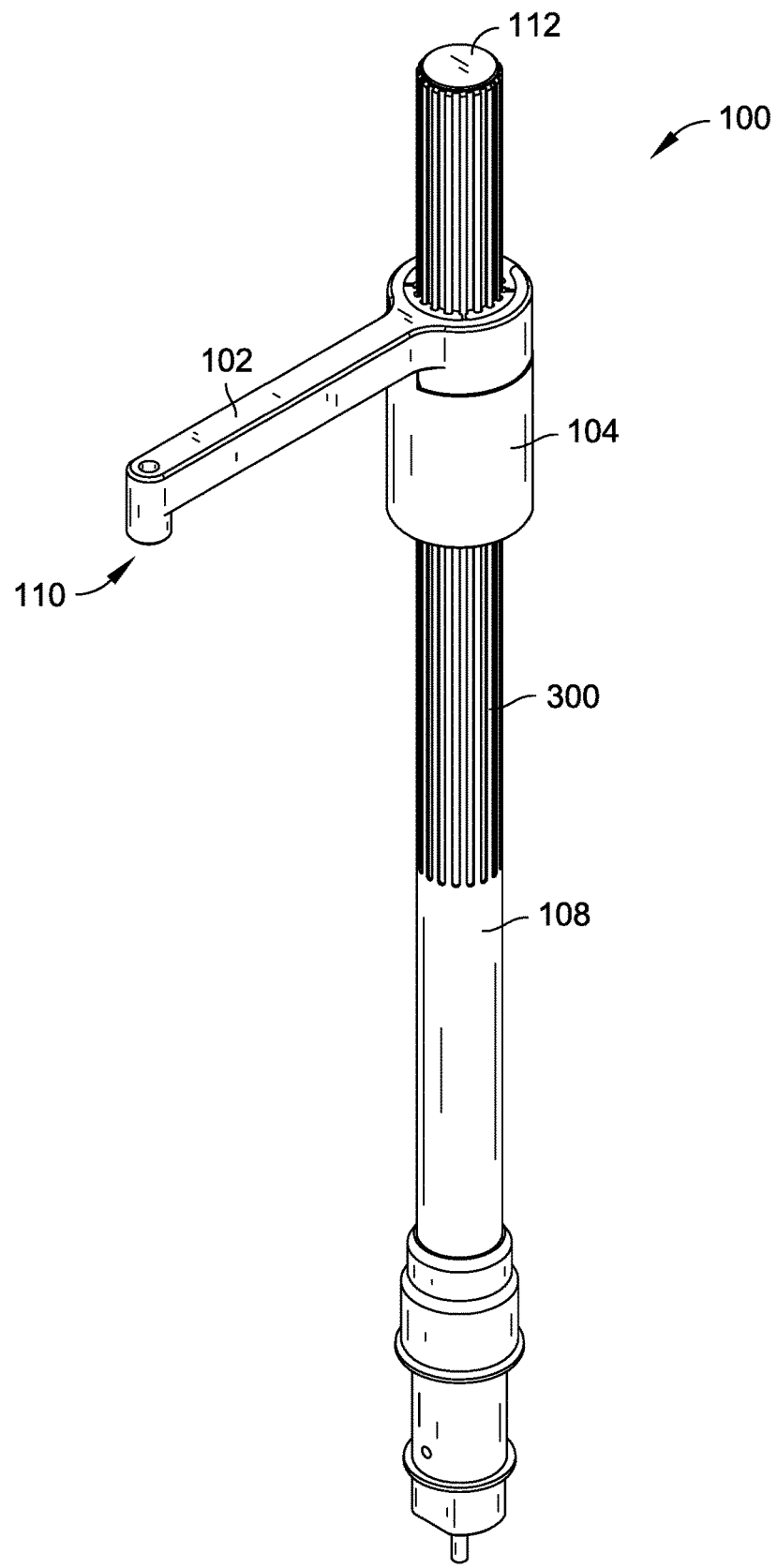
FIG. 1A is an isometric view of an autosampler probe rail system for preventing the release of metal particles from an autosampler that could otherwise be detected within a sample during sample analysis in accordance with an example embodiment of the present disclosure.

An automated sampling device, or autosampler, can support a sample probe relative to a vertically-oriented rod which moves the sample probe along or across one or more directions of movement. For instance, the sample probe can be coupled to a vertically-moveable portion of the rod by a probe support arm or other device to move the probe in a vertical direction, such as to position the probe into and out of sample vessels (e.g., tubes or other containers), rinse vessels, standard chemical vessels, diluent vessels, and the like, on a deck of the autosampler. In other situations, the rod can be rotated to facilitate movement of the probe about a horizontal plane, such as to position the probe above other sample vessels and other vessels positioned on the deck.

Autosamplers are used to automate the handling of multiple samples that are stored in sample containers, such as sample vials, sample tubes, microtiter wells, or the like. The sample containers can be supported by a sample rack on a deck of the autosampler to make the various sample containers available to the sample probe when the system is programmed to introduce the sample probe into the containers. Autosamplers can include metallic mechanical or structural parts that move with respect to each other to facilitate one or more motions of the probe. As the parts begin to wear (e.g., through repeated friction-based interactions), metal particles can be released onto the deck of the autosampler and into the vessels positioned about the probe arm. For instance, metal particles can be directly deposited into sample vessels, onto the probe, or into other vessels used in the sample preparation process (e.g., rinse containers, standard chemical containers, diluent containers, etc.), thereby introducing contaminants to the samples or other fluids. Such contaminants are detectable via analytic instruments and can skew analytic measurements of the samples and other fluids by providing unreliable or otherwise inaccurate data. Further, the metallic mechanic or structural parts can be exposed to harsh chemicals present on the autosampler deck, such as corrosive acids, which can accelerate the release of metal particles through normal operation of the autosampler.

Pendency of a sample awaiting handling by the autosampler can result in potential negative outcomes, such as loss of sample, contamination hazards, or other accuracy risks. The period of time that a given sample is held within the sample container typically depends on the duration of time required for a sample handling system to analyze all samples scheduled for analysis prior to the given sample. If the sample containers are open to the surrounding environment (e.g., with an open top), the given sample can be negatively affected for the period of time awaiting analysis. For example, portions of the sample can evaporate or otherwise be lost to the surrounding environment, contaminants can be introduced to the sample container through the open area of the sample container, portions of different samples can chemically react causing precipitates to form on portions of the system or within other sample containers, or another outcome can negatively influence the accuracy of analysis of the composition of the sample. The effects of evaporation can particularly influence small volume samples, where loss of even small amounts of solvent or other liquid portion can result in wide variances of analysis accuracy.

Accordingly, systems and methods are disclosed for handling samples held in closed sample containers by automatically removing sample container caps and positioning a sample probe. In an aspect, an autosampler system includes an automatic sample cap remover and a probe support arm, the autosampler system is configured to position the sample cap remover over a sample cap and temporarily or permanently remove the sample cap from the sample container, and position a sample probe held by the probe support arm into the sample container to withdraw a fluid-containing sample. The sample cap remover can be supported by a z-axis support that translates along a channel in the deck of the autosampler that provides movement along the z-axis and rotational movement along the x-y plane. In implementations, the z-axis support is coupled to each of the sample cap remover and the probe support arm. For example, the sample cap remover can be rotationally offset from the probe support arm along the x-y plane, such that when the sample cap remover is supporting a sample cap removed from a sample container, the sample cap does not intersect the vertical axis of the sample probe (e.g., to not interfere with inserting the sample probe into the sample container). Other configurations are contemplated, such as the sample cap remover and the sample probe being substantially vertically aligned.

Systems and methods are also disclosed for preventing the release of metal particles from an autosampler that could otherwise be detected within a sample during sample analysis. In an aspect, a system includes an inner shuttle magnetically coupled with an outer shuttle configured to support a sample probe. The inner shuttle is encapsulated within a tube formed from or coated with a chemically-inert material (e.g., a fluoropolymer) and the outer shuttle is formed from or coated with a chemically-inert material (e.g., a fluoropolymer) such that no metal features are exposed to the external environment during operation of the autosampler. The inner shuttle moves within the tube and the movement is translated to the outer shuttle via magnetic coupling which in turn is translated to the probe support structure. In implementations, the tube defines surface features (e.g., splines) on an outer surface of the tube, with the outer shuttle having corresponding features on an inner surface. The surface features of the tube and the outer shuttle interact to translate rotational motion of the tube to the outer shuttle, which in turn is translated to the probe support structure. The autosampler facilitates multiple planes of motion of the sample probe without risk of exposure of metal particles to the sample vessels and other containers positioned on the deck of the autosampler.

In an aspect, an autosampler system includes, but is not limited to, a z-axis support rotatable about a z-axis of an autosampler deck; a sample probe support structure coupled to the z-axis support, the sample probe support structure configured to hold a sample probe to withdraw a fluid-containing sample held within a sample container supported by the autosampler deck; and a sample cap remover coupled to the z-axis support in an orientation that is rotationally offset from the z-axis support with respect to the sample probe support structure, the sample cap remover configured to lift a cap from the sample container to provide access to an interior of the sample container by the sample probe supported by the sample probe support structure.

In an aspect, an autosampler system includes, but is not limited to, a z-axis support rotatable about a z-axis of an autosampler deck; a sample probe support structure coupled to the z-axis support, the sample probe support structure configured to hold a sample probe to withdraw a fluid-containing sample held within a sample container supported by the autosampler deck; and a sample cap remover coupled to the z-axis support, the sample cap remover including a clamp portion configured to interface with an exterior surface of the z-axis support, a cover portion configured to cover at least a portion of the clamp portion, and a cap remover support arm extending from the cover portion, the cap remover support arm being rotationally offset from the sample probe support structure at an angle across an x-y plane, wherein the sample cap remover is configured to lift a cap from the sample container to provide access to an interior of the sample container by the sample probe supported by the sample probe support structure.

Example Implementations

Referring to FIGS. 1A through 8, an autosampler probe rail system ("system 100") for preventing the release of metal particles from an autosampler that could otherwise be detected within a sample during sample analysis in accordance with an example embodiment of the present disclosure is shown. The system 100 generally includes a probe support arm 102, an outer shuttle 104, an inner shuttle 106, and a z-axis support 108. The probe support arm 102, the outer shuttle 104 and the z-axis support each include structures formed from or coated with a chemically-inert material to prevent exposure of metal components to the external environment of the system 100, such as to prevent introduction of metal contaminants into sample vessels or other fluid containers adjacent the autosampler. For example, the chemically-inert material can include, but is not limited to, a fluoropolymer, such as polytetrafluoroethylene (PTFE).

The probe support arm 102 includes a probe support 110 which holds a sample probe and associated tubing for drawing fluids from, or introducing fluids to, sample vessels positioned adjacent the system 100, such as on a deck of an autosampler system. The probe support arm 102 is coupled to the outer shuttle 104 (e.g., via friction fit interlock, via snap coupling, or the like), where each of the probe support arm 102 and the outer shuttle 104 define apertures into which an upper portion 112 of the z-axis support 108 fits to couple the probe support arm 102 and the outer shuttle 104 to the z-axis support 108. For example, the upper portion 112 of the z-axis support 108 includes a generally circular shape which corresponds to generally circular openings in each of the probe support arm 102 and the outer shuttle 104. While generally circular shapes are shown, other shapes can be utilized for the system 100 including but not limited to rectangular shapes, triangular shapes, irregular shapes, and the like. The probe support arm 102 can be held in place relative to the z-axis support 108 through friction fit between the respective structures and through magnetic coupling between the outer shuttle 104 and the inner shuttle 106 positioned within the z-axis support. In implementations, the probe support arm 102 and the outer shuttle 104, or portions thereof, can be formed as a unitary structure.

Figure 1B:
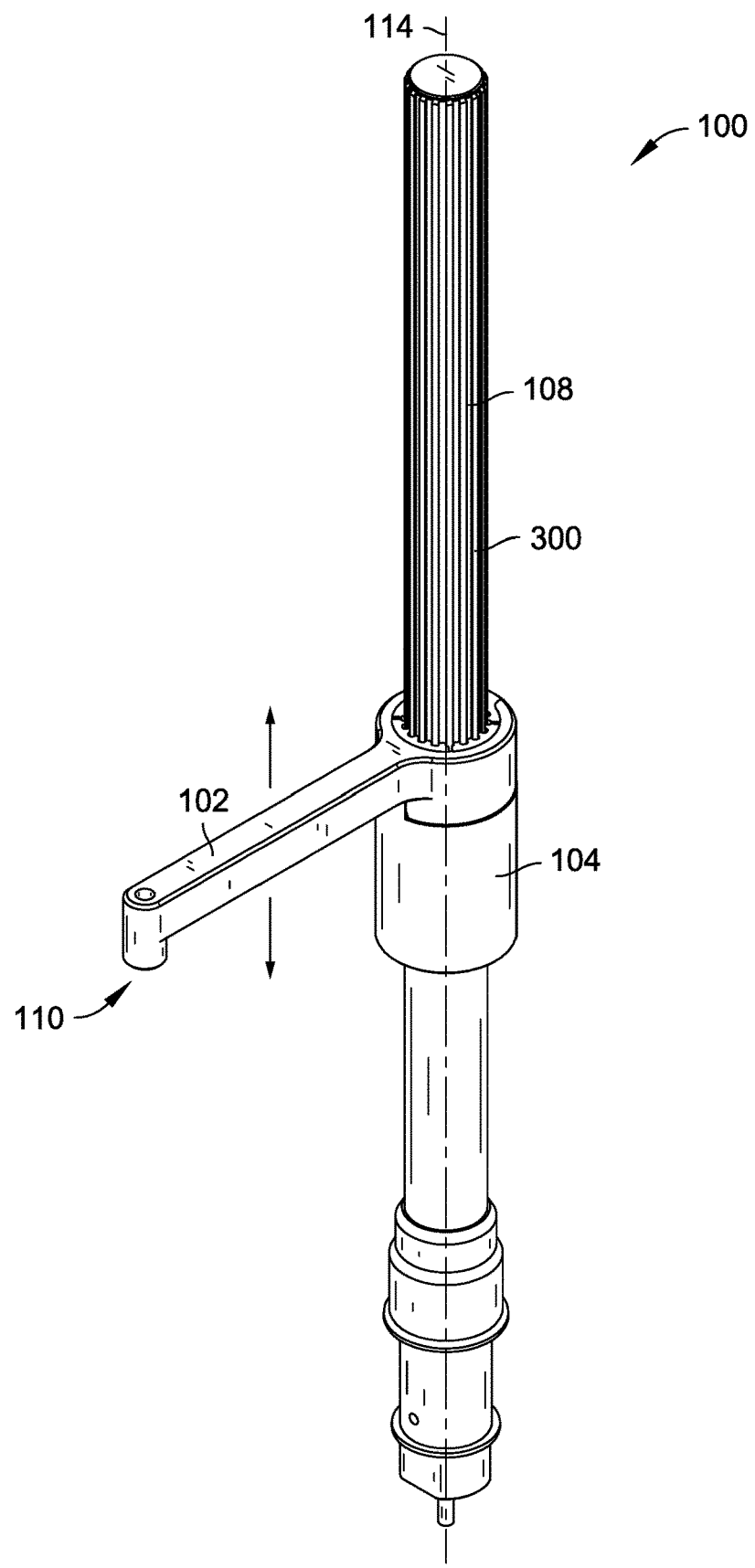
FIG. 1B is an isometric view of the autosampler probe rail system of FIG. 1A, with a support arm of the autosampler transitioned to a lower position along a z-axis.
Figure 1C:
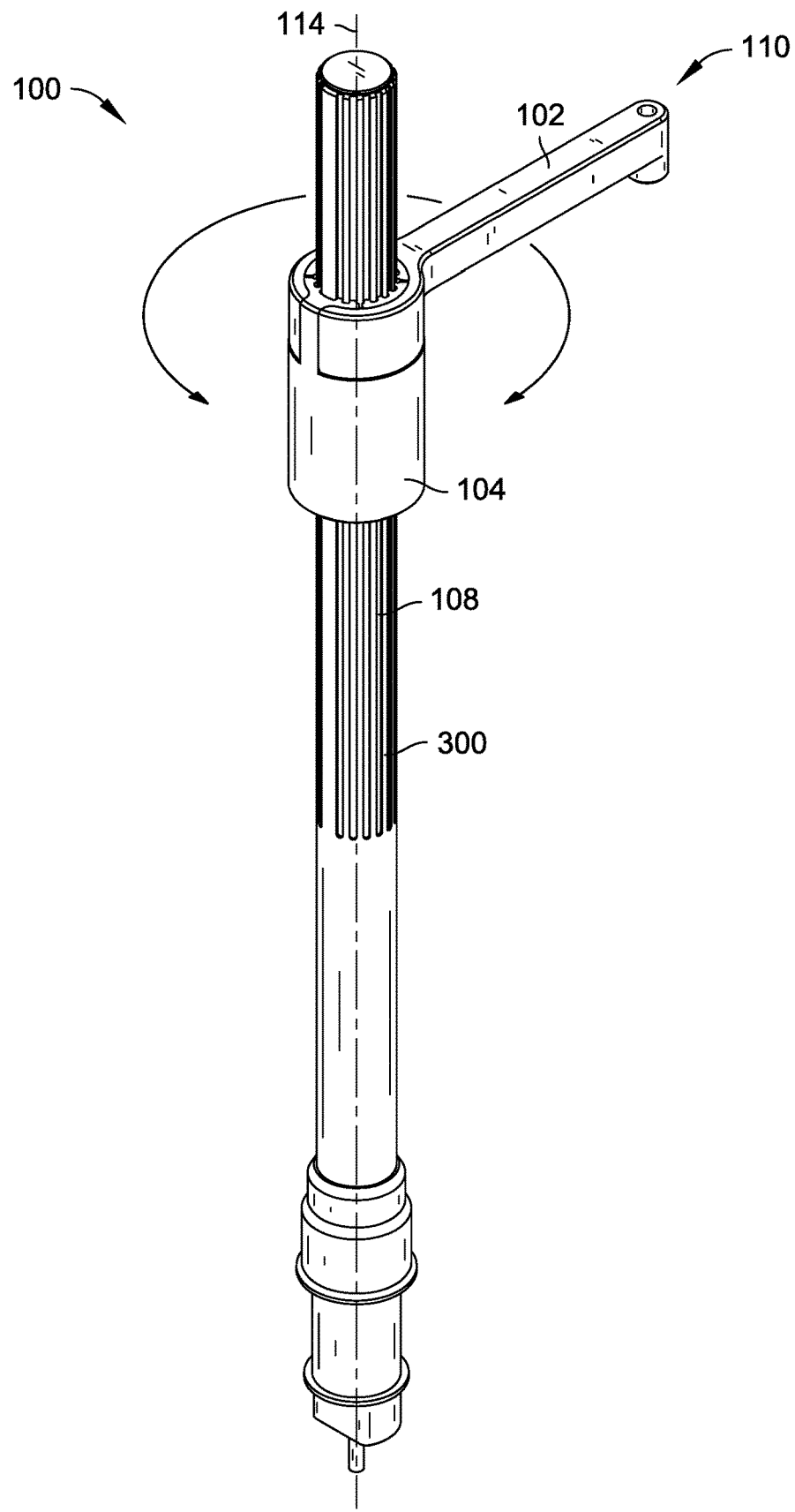
FIG. 1C is an isometric view of the autosampler probe rail system of FIG. 1A, with the support arm rotated about a z-axis.

The system 100 controls the positioning of a sample probe held by the probe support arm 102 through controlled positioning of the outer shuttle 104 and rotation of the z-axis support 108. For example, FIG. 1B shows movement of the outer shuttle 104 along the z-axis support 108 (e.g., along the z-axis 114), which in turn moves the probe support arm 102 via interactions between the outer shuttle 104 and the inner shuttle 106. FIG. 1C shows rotational movement of the probe support arm 102 through rotation of the z-axis support 108 described further herein.

Figure 2:
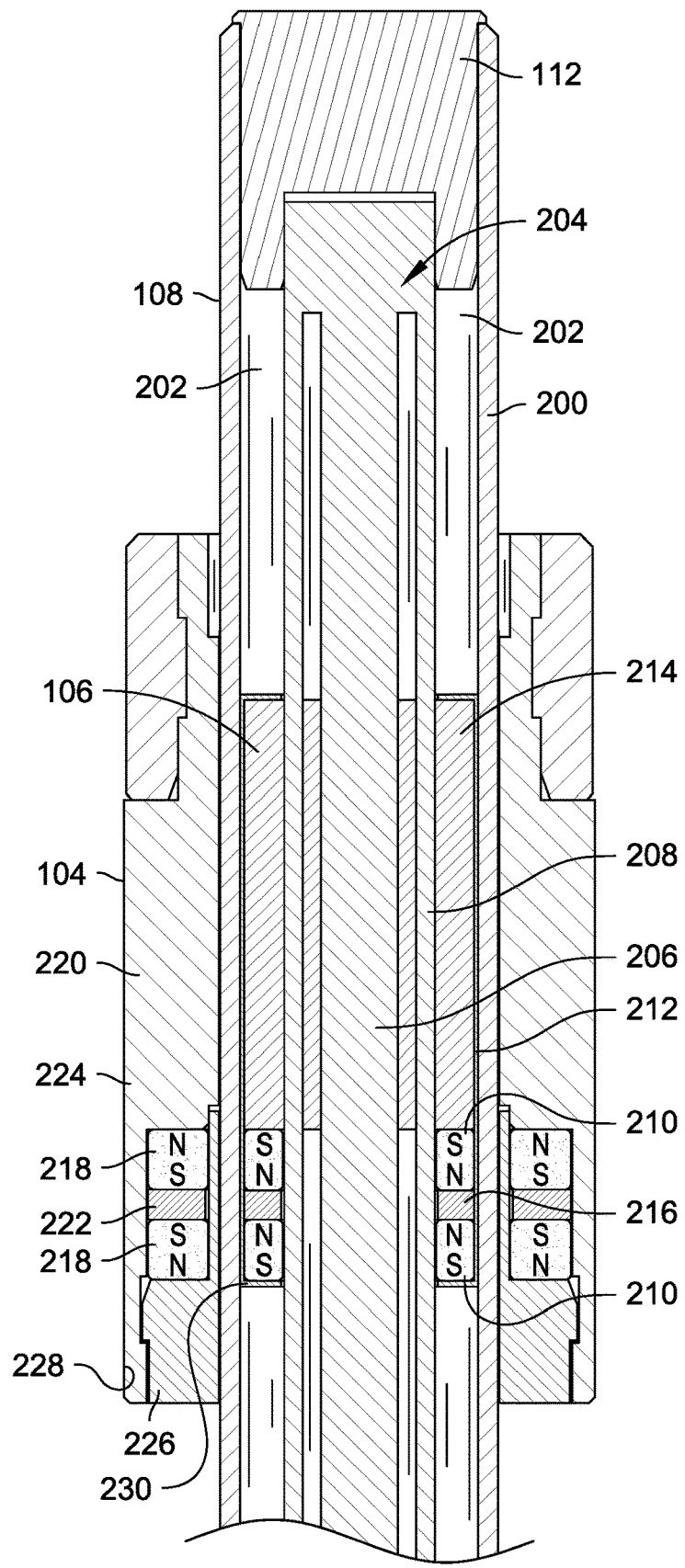
FIG. 2 is a partial cross-sectional side view of the autosampler probe rail system of FIG. 1A.
Figure 3:
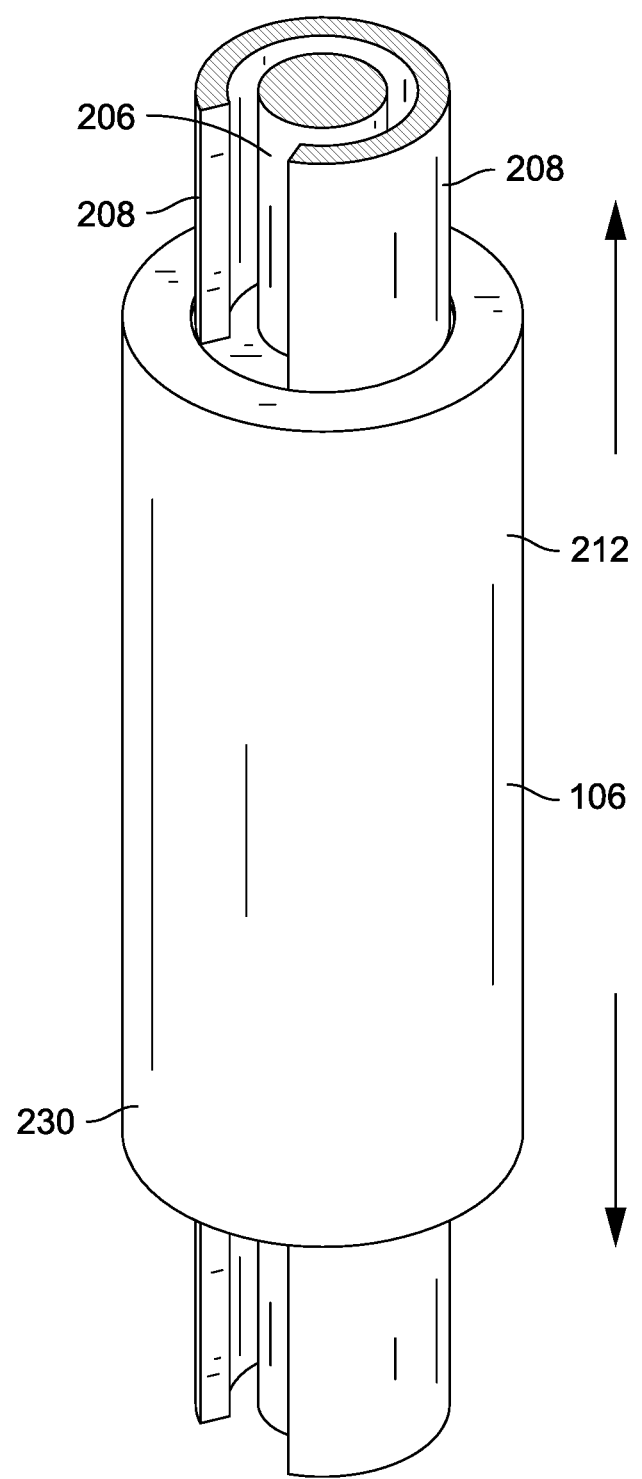
FIG. 3 is a partial isometric view of an inner shuttle of the autosampler probe rail system of FIG. 1A.
Figure 4:
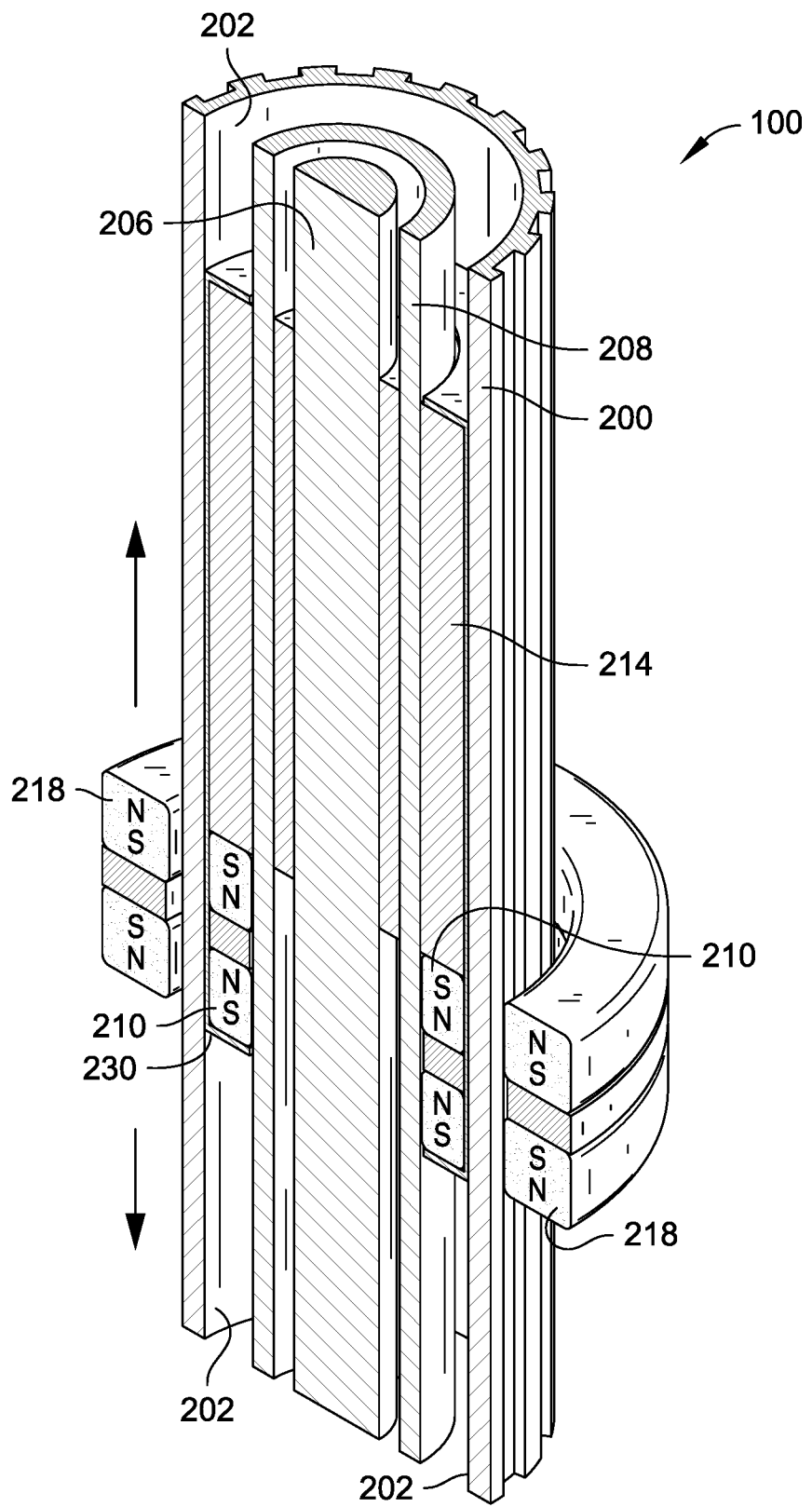
FIG. 4 is a partial cross-sectional isometric view of the autosampler probe rail system of FIG. 1A, showing magnets supported by the inner shuttle relative to magnets supported by an outer shuttle.
Figure 5:
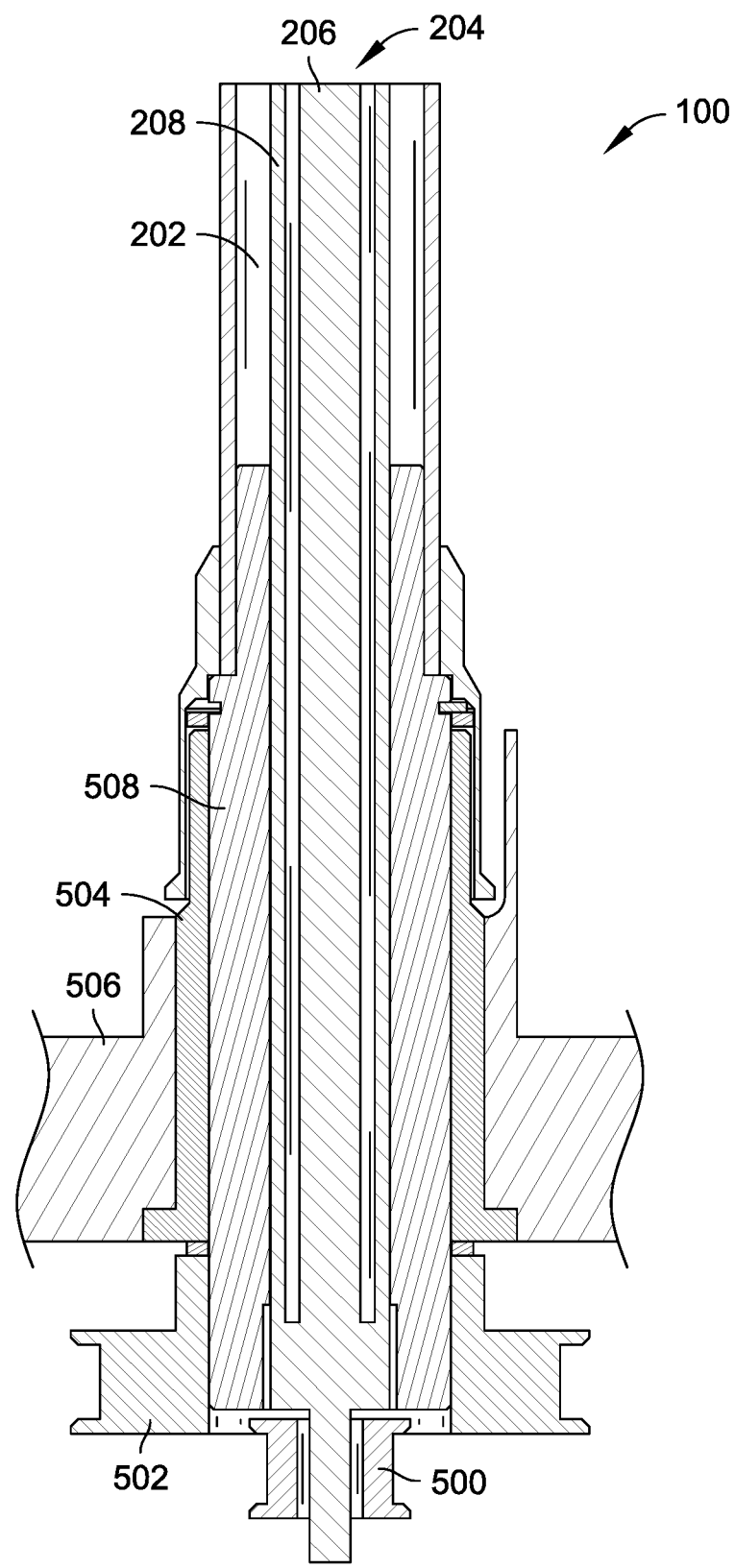
FIG. 5 is a partial cross-sectional side view of the autosampler probe rail system of FIG. 1A with an associated drive system.

Referring to FIG. 2, a cross-section of the system 100 is shown in accordance with example implementations of the present disclosure. The z-axis support 108 is shown having an external tube 200 defining an interior volume 202 through which the inner shuttle 106 is configured to pass to influence vertical movement of the outer shuttle 104. The system 100 can move the inner shuttle 106 within the tube 200 through various mechanisms including, but not limited to, a linear actuator (e.g., a pneumatic actuator) with a push rod, a spline screw rail, or combinations thereof. The system 100 is shown in example implementations having a spline screw rail 204 (e.g., as seen in FIGS. 2-5). The spline screw rail 204 includes a threaded screw 206 positioned along the z-axis 114 with a structural rail 208 positioned around a portion of the screw 206. The structural rail 208 is fixedly mounted to a base, while the screw 206 is rotatably coupled within the tube 200. For example, the system 100 can include a first drive (e.g., a pulley drive 500 shown in FIG. 5) to induce rotational motion of the screw 206 within the tube 200. The inner shuttle 106 includes corresponding threads on an interior surface of the inner shuttle 106 to mate with the threads of the screw 206. As the screw 206 is rotationally driven, the inner shuttle 106 is moved vertically along the z-axis 114 within the tube 200 (e.g., through the interior volume 202) via interaction between the respective threads. Alternatively or additionally, the system 100 includes a pneumatic actuator to push the inner shuttle 106 vertically within the interior volume 202. In implementations, the inner shuttle 106 defines one or more apertures to correspond to the shape of the structural rail 208 such that the structural rail 208 passes through the aperture(s) of the inner shuttle 106 as the inner shuttle 106 is moved within the tube 200. For example, the inner shuttle 106 is shown in an example embodiment in FIG. 3 with a 'C' shaped aperture to conform to the 'C' shaped structural rail 208.

The outer shuttle 104 and the inner shuttle 106 each include one or more magnets to magnetically couple the respective shuttles such that when the inner shuttle 106 is driven along the z-axis 114 (e.g., via operation of the spline screw rail 204 and the first drive, via operation of a pneumatic actuator, etc.), the outer shuttle 104 follows a corresponding vertical movement along the outer surface of the z-axis support 108. For example, the inner shuttle 106 is shown having two magnets 210 positioned within an external structure 212 of the inner shuttle 106. The external structure 212 can include, but is not limited to, a polyvinylidene difluoride (PVDF) material wrapped around a body structure 214 of the inner shuttle 106. In implementations, the body structure 214 defines the corresponding threading to mate with the threading of the screw 206. The magnets 210 are shown having a circular or ring shape having an aperture in the middle through which structure of the spline screw rail 204 can pass. For example, the magnets 210 surround the z-axis 114 with the spline screw rail 204 passing through the aperture of the magnets 210. The inner shuttle 106 is shown with a spacer structure 216 positioned between the magnets 210. The external structure 212 and the body structure 214 can push each magnet 210 against the spacer structure 216 to control the separation between the magnets 210, such as to maintain a substantially uniform distance between the magnets 210 during operation of the system 100. The magnets 210 are aligned such that the same poles face each other (e.g., the same pole interfaces with the spacer structure 216). For example, FIG. 2 shows that the north poles of each magnet 210 face each other with the spacer structure 216 positioned in between and with the south poles oriented away from each other. Alternatively, the south poles of the magnets 210 could face each other with the north poles oriented away from each other.

The outer shuttle 104 includes corresponding magnets to interact with the magnets 210 of the inner shuttle 106. For example, the outer shuttle 104 is shown having two corresponding magnets 218 held within a body structure 220. Similar to the inner shuttle 106, the outer shuttle 104 can include a spacer structure 222 positioned between the magnets 218 within the body structure 220. In implementations, the body structure 220 includes a top portion 224 coupled with a bottom portion 226 with a cavity defined between the top portion 224 and the bottom portion 226 to house the magnets 218 and the spacer structure 222. The top portion 224 and the bottom portion 226 can be secured together (e.g., snap fit) to position the magnets 218 against the spacer structure 222. The magnets 218 are aligned such that the same poles face each other, with the poles of the magnets 218 having the opposite poles facing the poles of the adjacent magnets 210 of the inner shuttle 106. For example, as shown in FIG. 2, the north poles of the magnets 218 face the south poles of the magnets 210 (e.g., with the tube 200 positioned therebetween), and the south poles of the magnets 218 face the north poles of the magnets 210 (e.g., with the tube 200 positioned therebetween). By facing the opposing poles of the magnets 210 and the magnets 218, the magnetic fields couple the inner shuttle 106 with the outer shuttle 104 such that linear motion of the inner shuttle 106 causes a corresponding linear motion of the outer shuttle 104. While the system 100 is shown having two magnets for each of the outer shuttle 104 and the inner shuttle 106, the system 100 is not limited to two magnets and can include fewer or more magnets for each shuttle (e.g., depending on a desired attractive force between the respective shuttles).

In implementations, the tube 200 defines surface features on an outer surface of the tube 200 to facilitate rotational motion of the outer shuttle 104 when the tube 200 is rotated. For example, the tube 200 is shown having a plurality of splines 300 longitudinally oriented along the outer surface of the tube 200. The outer shuttle 104 includes corresponding features on an inner surface to interface with the surface features of the tube 200. For example, the outer shuttle 104 is shown having corresponding splines 302 that mate with gaps between the splines 300 of the tube 200. The surface features of the tube 200 and the outer shuttle 104 interact to translate rotational motion of the tube 200 to the outer shuttle 104, which in turn is translated to the probe support structure 102 to rotate the probe support structure 102 about the z-axis 114. In implementations, the tube 200 is rotated through operation of a second drive (e.g., a pulley drive 502 shown in FIG. 5) to induce rotational motion of the tube 200. For example, the system 100 can include a bushing 504 coupled between a stationary drive base 506 and a rotational drive structure 508. The rotational drive structure 508 is coupled to the pulley drive 502 to rotate about the z-axis 114 upon operation of the pulley drive 502. The tube 200 is coupled to the rotational drive structure 508 to correspondingly rotate upon operation of the pulley drive 502, which in turn rotates the outer shuttle 104 through interaction of the corresponding surface features (e.g., splines 300 and 302) to rotate the probe support structure 102.

Figure 6:
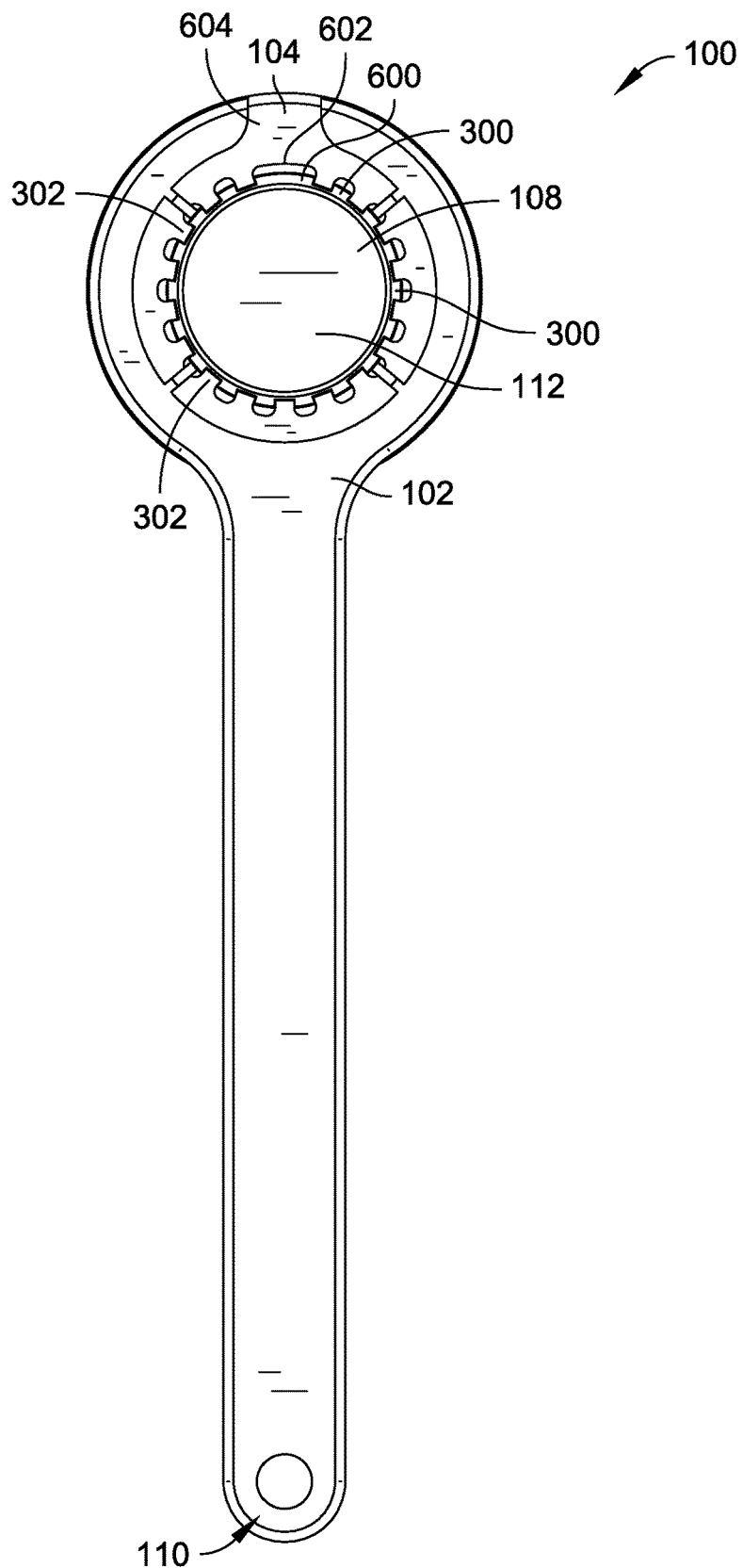
FIG. 6 is a top view of the autosampler probe rail system of FIG. 1A.
Figure 7:
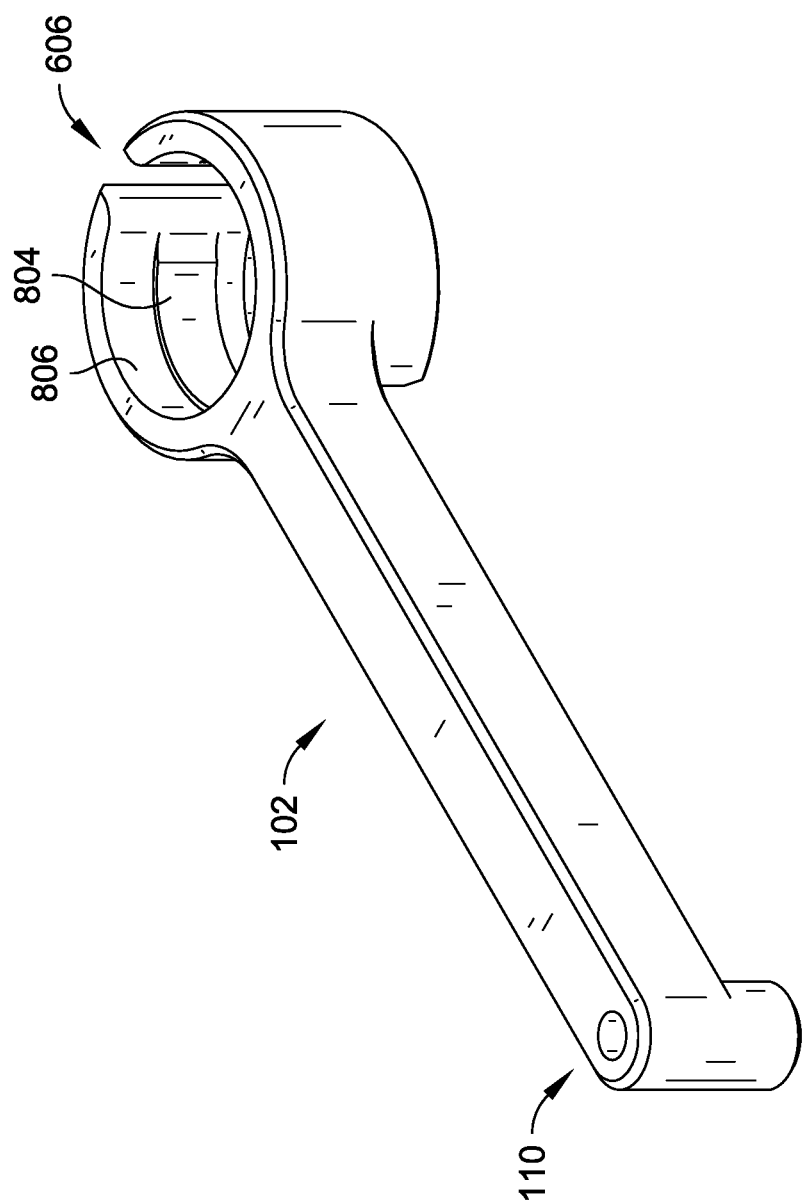
FIG. 7 is an isometric view of a support arm of the autosampler probe rail system of FIG. 1A.

The outer shuttle 104 can be installed onto the z-axis support 108 by positioning the body structure 220 adjacent the upper portion 112 of the z-axis support 108, with an end 228 of the body structure 220 housing the magnets 218 being positioned to correspond to an end 230 of the body structure 214 housing the magnets 210 to permit interaction between the respective magnetic fields of the inner shuttle 106 and the outer shuttle 104 to magnetically couple the respective shuttles. The surface features of the outer shuttle 104 and the tube 200 (e.g., splines 302 and 300, respectively) can slide next to each other as the outer shuttle 104 is positioned down the z-axis support 108 until the magnets 218 couple with the magnets 210. In implementations, the system 100 includes a key structure to orient the probe support structure 102 in a predetermined direction upon installation on the z-axis support 108, such as to provide a specific position of a probe held by the probe support structure 102 for indexing purposes through rotation of the tube 200. For example, FIG. 6 shows the tube 200 defining a key structure 600 (e.g., a spline having a larger cross section than other splines 300), with the outer shuttle 104 defining a corresponding key structure 602 (e.g., an aperture to receive the key structure 600). The probe support structure 102 and the outer shuttle 104 also include corresponding key structures to provide a desired orientation of the probe support structure 102 with respect to the tube 200. For example, the outer shuttle 104 is shown including a key structure 604 with the probe support structure 102 including a corresponding key structure 606 (e.g., an aperture to receive the key structure 604). In implementations, the probe support structure 102 is removably coupled to the outer shuttle 104, such that a different probe support structure 102 can couple with the outer shuttle 104. Alternatively or additionally, a different outer shuttle can be positioned on the z-axis support 108 to introduce a different style of probe support structure onto the z-axis support (e.g., to facilitate a septum piercing probe, or the like).

Figure 8:
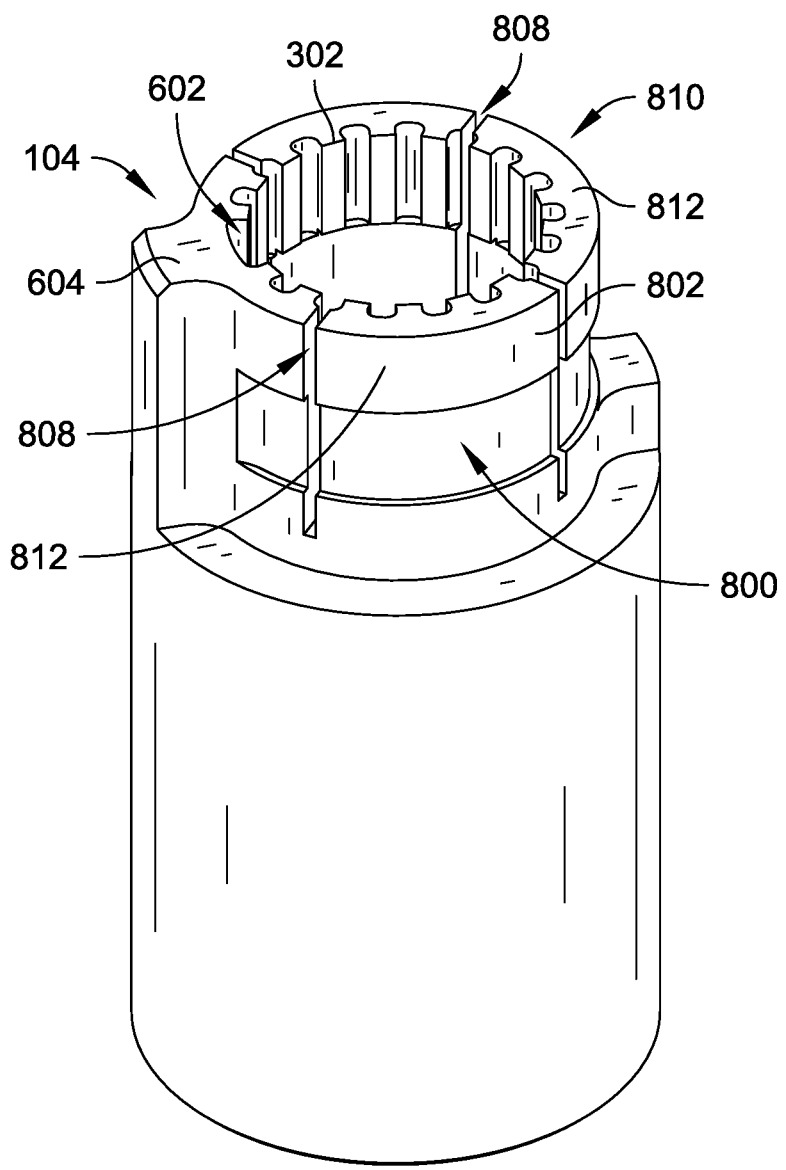
FIG. 8 is a partial isometric view of an outer shuttle of the autosampler probe rail system of FIG. 1A in accordance with an example embodiment of the present disclosure.

The probe support structure 102 and the outer shuttle 104 can include a locking structure to secure the probe support structure 102 relative to the outer shuttle 104. For example, the outer shuttle 104 is shown in FIG. 8 defining a groove 800 on an outer surface 802 of the body structure 220 that is sized and dimensioned to receive a protrusion 804 (e.g., shown in FIG. 7) positioned on an interior surface 806 of the probe support structure 102. Alternatively or additionally, the probe support structure 102 can define a groove and the outer shuttle 104 can define a corresponding protrusion. During installation of the probe support structure 102 onto the outer shuttle 104, the protrusion 804 can mate with the groove 800 to provide a lock-fit arrangement between the probe support structure 102 and the outer shuttle 104 to securely hold the probe support structure 102 relative to the outer shuttle 104 and z-axis support 108. For example, interaction between the groove 800 and the protrusion 804 can prevent removal of the probe support structure 102 from the outer shuttle 104 via vertical forces overcoming mere friction fit between the probe support structure 102 and the outer shuttle 104.

In implementations, the outer shuttle 104 can define segments at a top portion of the outer shuttle 104 receiving the probe support structure 102. The probe support structure 102 can push against the segments which in turn provide a compliant fit against the tube 200 of the z-axis support 108 to provide a secure fit of the outer shuttle 104 and the z-axis support 108. For example, the outer shuttle 104 is shown in FIG. 8 to include a plurality of vertically cuts 808 through a top portion 810 of the outer shuttle 104 to divide the top portion 810 into multiple segments 812. When the probe support structure 102 is introduced onto the outer shuttle 104, the probe support structure 102 can provide an inward force onto the segments 812, which in turn can push against the z-axis support (e.g., against the splines 300) to secure the outer shuttle 104 in place. While FIG. 8 shows the top portion 810 divided into four segments 812, the present disclosure is not limited to such arrangement. For instance, the top portion 810 could be divided into fewer than four segments 812, into more than four segments 812, into equally-sized segments 812, into unequally-sized segments, or the like.

Referring now to FIGS. 9-12D, the system 100 is shown with an example configuration for handling samples held in closed sample containers by automatically removing sample container caps and positioning a sample probe to remove samples from sample containers following cap removal, cap repositioning, or cap reconfiguration. The system 100 generally includes a z-axis support 900, a probe support arm 902, and a sample cap remover 904. The system 100 coordinates the activity of each of the z-axis support 900, the sample cap remover 904, and a sample probe 906 held by the probe support arm 902 to position the sample cap remover 904 over a specified sample container that has a cap or other structure enclosing a sample within the sample container (e.g., positioned on a deck 908 of the system 100), remove the cap or otherwise modify the cap to permit access by the sample probe, introduce the sample probe to an interior of the sample container to remove a sample, optionally replace the cap back onto the sample container, and reposition the sample cap remover 904 to another sample container to repeat the cap removal/sample removal procedure. For example, the sample cap remover 904 can include, but is not limited to, a vacuum tweezer to remove the cap with vacuum pressure, a rotary grip structure (e.g., to rotate a cap about container threading(s)), a rotary positioning structure (e.g., to reposition a cap away from a z-axis), a prong or forceps structure (e.g., to friction fit about an exterior of the cap), or the like, or combinations thereof. An example process for removal and repositioning of a sample cap for access into the sample vessel interior by the sample probe 906 is described further herein with respect to FIGS. 12A-12D. In implementations, the z-axis support 900 and the probe support arm 902 correspond to the z-axis support 108 and the probe support arm 102 (e.g., to facilitate prevention of metal particle contamination), however the disclosure is not limited to such implementations, where the system 100 can include other configurations and compositions of the z-axis support 900 and the probe support arm 902.

Figure 9:
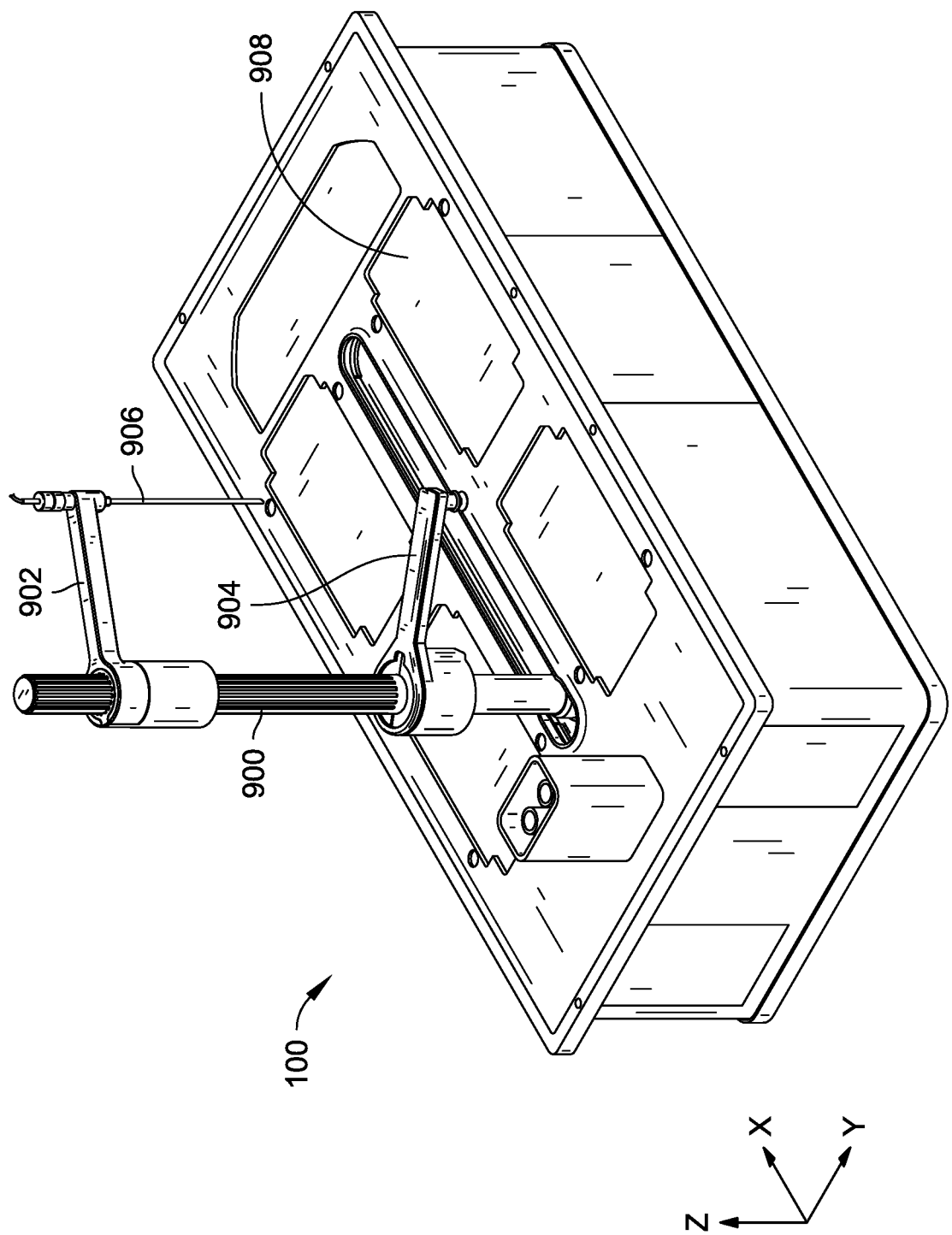
FIG. 9 is an isometric view of an autosampler system with automated sample container cover removal and sample probe positioning in accordance with an example embodiment of the present disclosure.
Figure 10A:
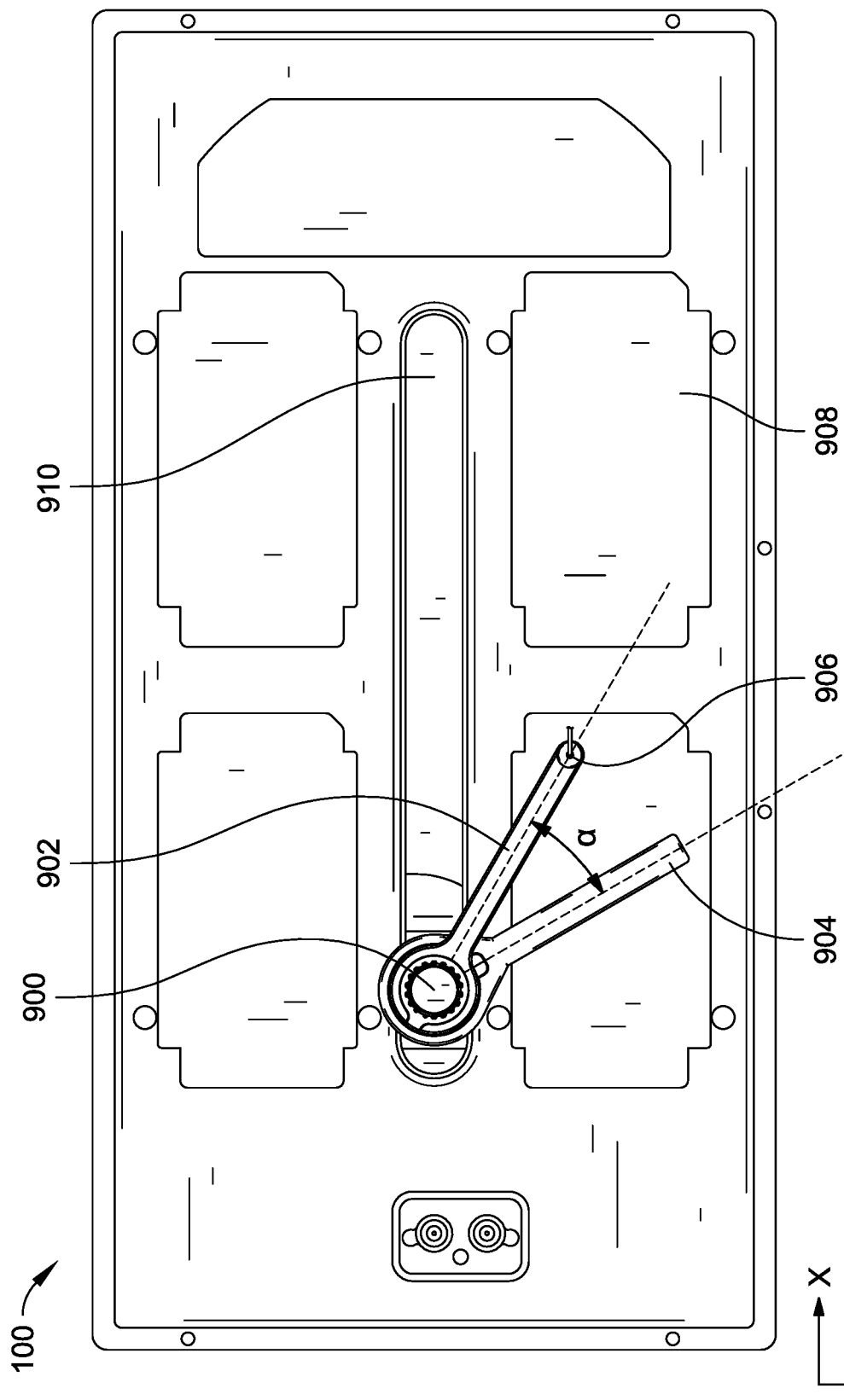
FIG. 10A is a top view of the autosampler system of FIG. 9.
Figure 10B:
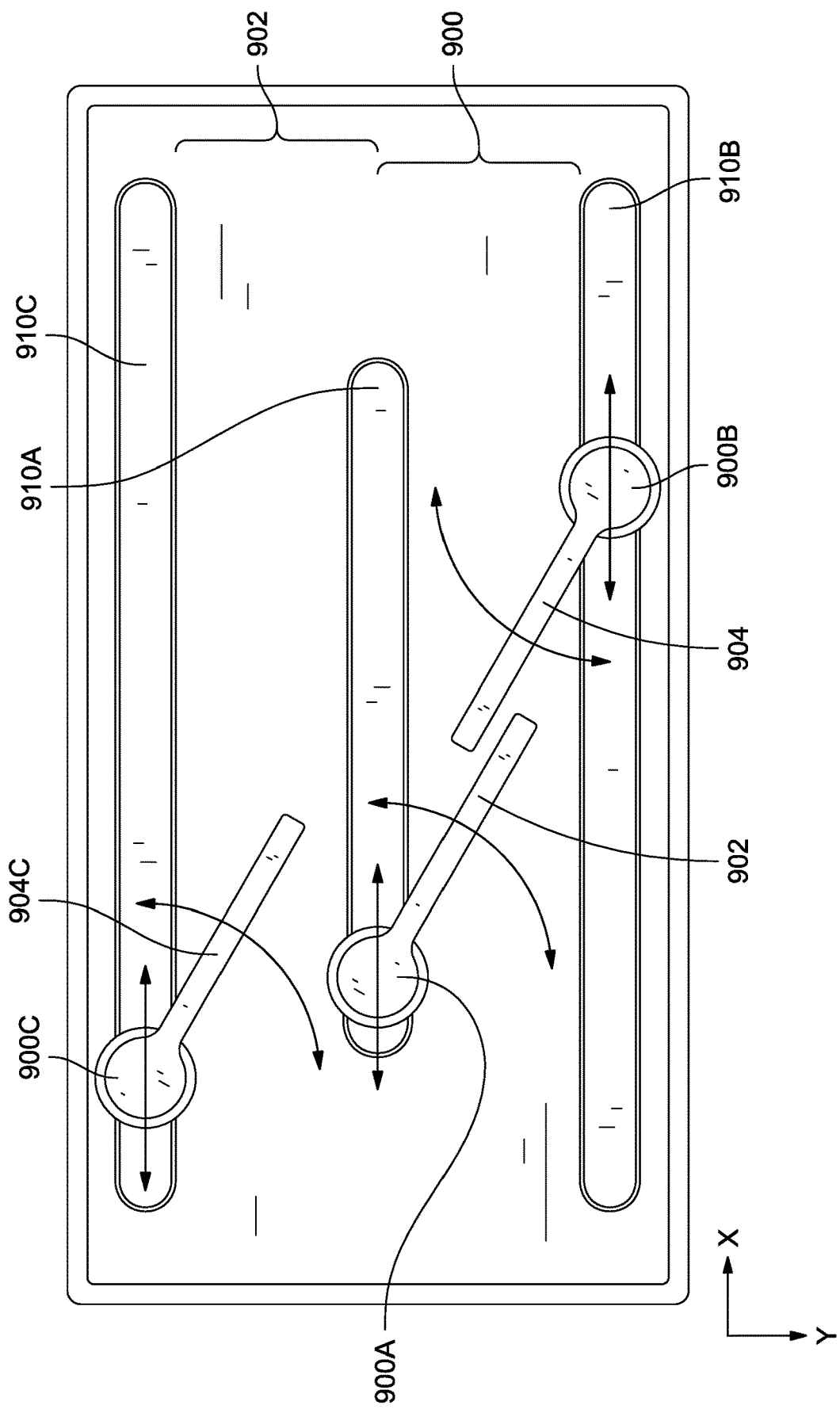
FIG. 10B is a diagrammatic view of an autosampler system with automated sample container cover removal and sample probe positioning having a plurality of rails to position sample probes and/or container cover positioning elements in accordance with an example embodiment of the present disclosure.

The probe support arm 902 and the sample cap remover 904 are shown in FIGS. 9 and 10A supported by the same z-axis support 900, which can translate across the autosampler deck 908 through a channel 910 and rotate about the z-axis via motor operation. In implementations, the probe support arm 902 and the sample cap remover 904 are positioned in one or more non-parallel orientations with the probe support arm 902 and the sample cap remover 904 rotationally offset from each other. For example, the probe support arm 902 and the sample cap remover 904 can be displaced from each other along the x-y plane by an angle (shown as a in FIG. 10A). The angle can be selected based on the size of the cap to be removed by the sample cap remover 904, such that, for example, when the cap is removed from the sample container, the z-axis support 900 rotates about the z-axis to displace the cap along the x-y plane and to position the sample probe 906 over the open end of the sample container with the cap positioned to not intersect the vertical axis of the sample probe (e.g., to not interfere with inserting the sample probe into the sample container). In implementations, the angle across the x-y plane from the z-axis can be from about 5 degrees to about 90 degrees. For example, the angle across the x-y plane from the z-axis can be from about 10 degrees to about 35 degrees. A smaller angle can reduce the amount of time that the system 100 takes to process a given sample, such as by requiring smaller movements to position the probe support arm 902 and the sample cap remover 904.

Alternatively or additionally to single-z-axis support, the probe support arm 902 and the sample cap remover 904 can be supported on separate z-axis supports 900. For example, referring to FIG. 10B, the probe support arm 902 is shown supported by a first z-axis support 900A and the sample cap remover 904 is shown supported by a second z-axis support 900B to facilitate cap removal of samples supported on a first portion 1000 of the deck 908. The first z-axis support 900A translates across a first channel 910A and rotates about the z-axis of the first z-axis support 900A to position a sample probe over sample containers held on the first portion 1000 of the deck 908, whereas the second z-axis support 900B translates across a second channel 910B and rotates about the z-axis of the second z-axis support 900B to position the sample cap remover 904B over sample containers held on the first portion 1000 of the deck 908. A third z-axis support 900C is also shown to provide another sample cap remover 904C to facilitate cap removal of samples supported on a second portion 1002 of the deck 908, with motion translated across a third channel 910C and rotation about the z-axis of the third z-axis support 900C to position the sample cap remover 904C over sample containers held on the second portion 1002 of the deck 908. In implementations, the second z-axis support 900B can fully rotate the probe support arm 902 about the z-axis to provide access by the sample probe 906 to sample vessels that have had their caps removed by the sample cap removers 904B and 904C, or by another portion of the system 100.

Figure 11:
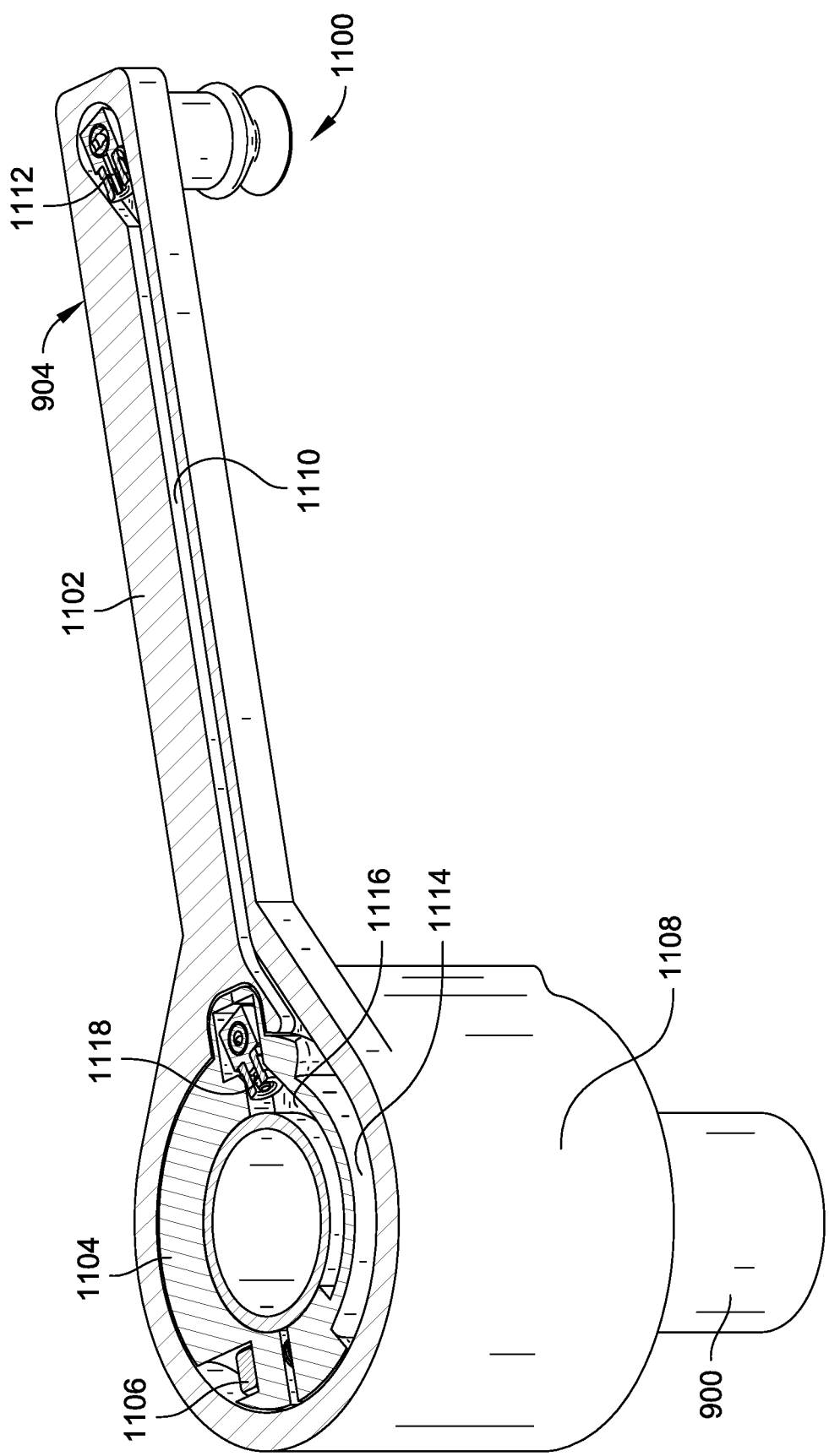
FIG. 11 is an isometric cross-sectional view of a sample cap remover of the autosampler system of FIG. 9 in accordance with an example embodiment of the present disclosure.

Referring to FIG. 11, the sample cap remover 904 is shown in an example embodiment including a vacuum tweezers structure 1100 supported by a cap remover support arm 1102 that secures the vacuum tweezers structure 1100 relative to the z-axis support 900. The sample cap remover 904 can include a clamp portion 1104 that provides a friction fit around an exterior surface of the z-axis support 900 (e.g., via a clamp fastener 1106) to resist vertical or rotational movement of the clamp portion 1104 on or about the z-axis support 900. Rotational movement of the z-axis support 900 about the z-axis and translation movement along the channel 910 is translated to the clamp portion 1104 via the connection between the clamp portion 1104 and the z-axis support 900. The sample cap remover 904 can also include a cover portion 1108 configured to cover at least a portion of the clamp portion 1104 (e.g., to prevent exposure of the clamp portion 1104 to an external environment of the system 100). The cap remover support arm 1102 extends from the cover portion 1108 to position the vacuum tweezers structure 1100 substantially distal from the clamp portion 1104 when the cover portion 1108 is positioned on the clamp portion 1104. In implementations, the cover portion 1108 rests on the clamp portion 1104 (e.g., a top of the cover portion 1108 can interface with a top of the clamp portion 1104) while permitting vertical movement of the cover portion 1108 with respect to the clamp portion 1104 to aid in vertically displacing caps from their respective sample vessels (e.g., during operation of the vacuum tweezers structure 1100, as described herein).

The sample cap remover 904 can define one or more spaces through which fluid tubing can pass to introduce vacuum pressure, fluid pressure, or combinations thereof (e.g., which can be sourced from the system 100 or external the system) to portions of the sample cap remover 904. In implementations, the sample cap remover 904 defines a channel 1110 through the cap remover support arm 1102 to hold a vacuum line for coupling with a vacuum tweezer port 1112 of the vacuum tweezers structure 1100 to supply a vacuum to the vacuum tweezers structure 1100 through the sample cap remover 904. The vacuum tweezers structure 1100 can then interact with caps held on sample vessels, such as by removing a cap through introduction of a vacuum to the vacuum tweezer port 1112 and by replacing a cap through ceasing the vacuum applied to the vacuum tweezer port 1112. In implementations, the sample cover remover 904 defines a channel 1114 between the clamp portion 1104 and the cover portion 1108 in communication with the channel 1110 to supply the vacuum line through the sample cover remover 904 to the vacuum tweezers structure 1100 via the channels 1114 and 1110. Alternatively or additionally, the sample cap remover 904 can hold a vacuum line, a fluid line, or combinations thereof within a different portion of the body of the sample cap remover 904, on a surface of the sample cap remover, or combinations thereof.

In implementations, the sample cap remover 904 defines spaces to introduce one or more fluid lines to introduce pressurized fluid to the sample cap remover 904 for vertical displacement of the cover portion 1108 relative to the clamp portion 1104 to facilitate cap removal and replacement on sample vessels. For example, the sample cap remover 904 can define a channel 1116 (e.g., through or defined by the clamp portion 1104) to introduce a fluid line through the sample cap remover 904 to a piston port 1118 coupled to a piston within the sample cap remover 904 (e.g., housed via one or more of the cover portion 1108 or the clamp portion 1104). In implementations, the sample cap remover 904 maintains a raised position to position the vacuum tweezers structure 1100 raised above a cap on a sample vessel (e.g., to prevent initial contact between the cap and the tweezers structure 1100 until the sample cap remover 904 is lowered). The piston can push the cover portion 1108 vertically downwards relative to the clamp portion 1104 to a lowered position upon application of air to the piston port 1118 to lower the vacuum tweezers structure 1100 into contact with the cap. A spring can bias the piston to the raised position when no fluid or insufficient fluid pressure is applied to the piston port 1118, such as when a single acting piston is included in the sample cap remover 904. Alternatively, the piston can include a spring to bias the piston in the lowered position and the fluid pressure pushes the piston to cause the cover portion 1108 to lift to the raised position upon application of air to the piston port 1118. In implementations, a dual acting piston can be utilized to bias the resting position of the sample cap remover via fluid pressure.

The vertical displacement of the cover portion 1108 relative to the clamp portion 1104 can provide a distance to raise the cap from the sample vessel for rotation of the sample cap remover 904 about the z-axis (e.g., via rotational motion of the z-axis support 900) without interference between the cap and the sample vessel, such as during movement of the cap away from the sample vessel to provide access to the sample vessel for the sample probe 906. In implementations, the vertical distance is from about 5 mm to about 40 mm to provide cap lift-off from the sample vessel, however the system 100 is not limited to such distances and can include vertical distances less than about 5 mm or more than about 40 mm. Additionally, while the system 100 is described including a pneumatic piston to provide the vertical displacement, the system 100 is not limited to such structure and can include additional or alternative structures to induce vertical movement of the sample cap remover 904 including, but not limited to, a shuttle within the z-axis support 900 magnetically coupled to the sample cap remover 904, a mechanical push rod, a linear drive, a magnetic coupling, a controllable electromagnetic coupling, or the like.

Referring to FIGS. 12A through 12D, an example operation of the system 100 is shown, with the probe support arm 902 and the sample cap remover 904 secured to a single z-axis support 900 and with the sample cap remover 904 including a pneumatic vacuum tweezers structure. The system 100 is shown with a plurality of sample containers having their interior volumes enclosed by caps positioned over the openings at the tops of the sample containers. The caps can serve multiple functions while the samples await handling by the system. For example, the caps can prevent contamination of samples by preventing chemicals or objects from the environment from being introduced through an opening in the sample container (e.g., such as while the probe is maneuvered from container to container). Additionally, the caps can prevent evaporation of one or more sample components, such as a solvent, sample matrix, or other component. Further, the caps can prevent portions of one sample from interacting with (e.g., chemically reacting with) another portion of another sample. For example, the caps can prevent vapor from one container (e.g., holding ammonium hydroxide) from interacting with vapor from another container (e.g., holding hydrofluoric acid) and chemically reacting to form solid precipitates (e.g., ammonium fluoride crystals) that can coat portions of the system 100. In the examples shown, the caps are maintained on the sample containers by weight alone, however in implementations, the caps could be held in place via one or more of threadings, clips, gaskets, or other structure(s).

Figure 12A:
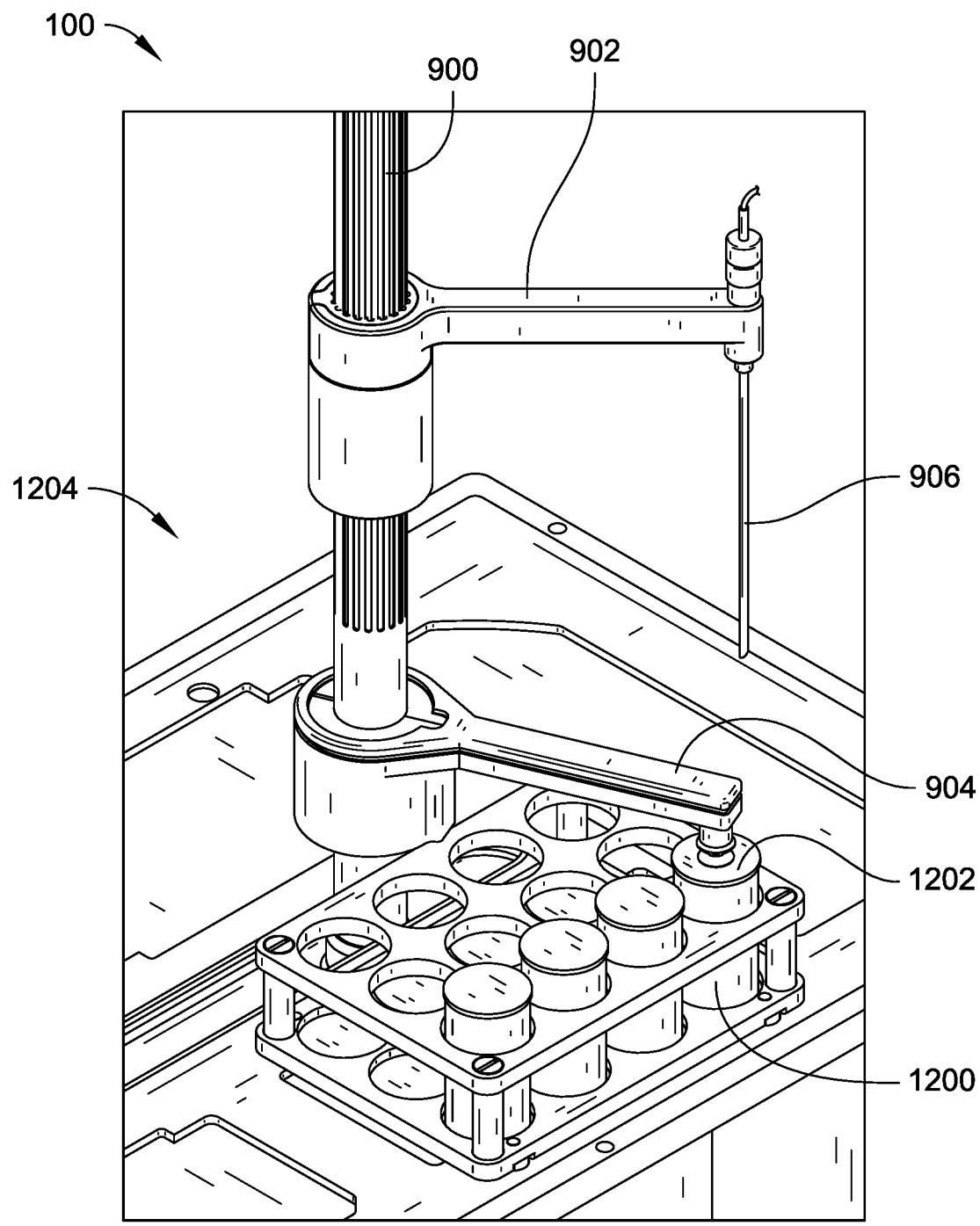
FIG. 12A is a side view of the autosampler system of FIG. 9 shown with the cover positioning tool positioned over a covered sample container in accordance with an example embodiment of the present disclosure.
Figure 12B:
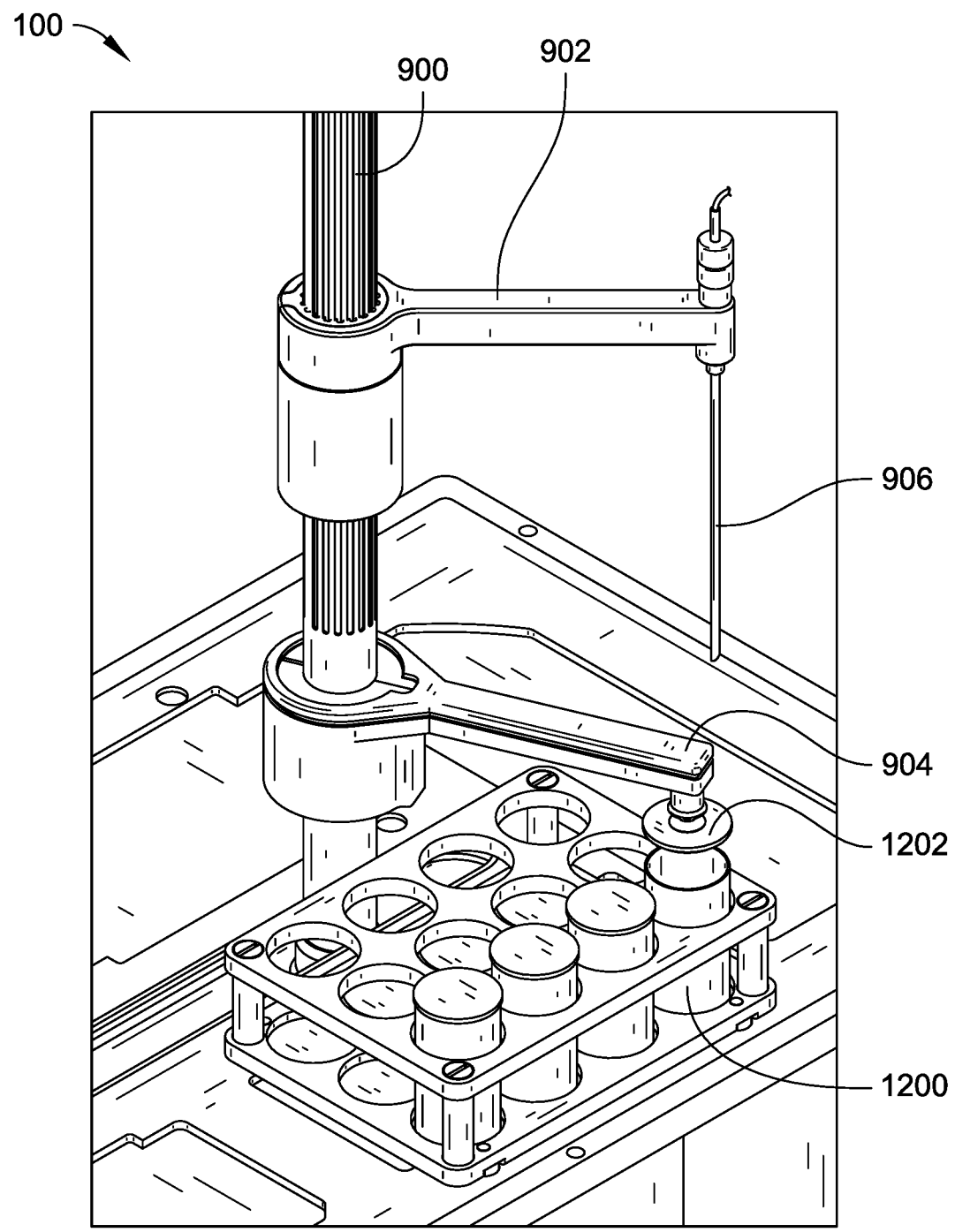
FIG. 12B is a side view of the autosampler system with the cover positioning tool removing a cover from the sample container.

In FIG. 12A, the system 100 positions the sample cap remover 904 over a first sample container 1200 having a first cap 1202 positioned on top of the first sample container 1200 to isolate a fluid sample held within the first sample container 1200 from the external environment 1204. The sample cap remover 904 then removes the first cap 1202 from the top of the first sample container 1200 by lifting the first cap 1202 vertically along the z-axis (e.g., through pneumatic actuation of the sample cap remover 904), as shown in FIG. 12B. For example, the system 100 can introduce a vacuum to the vacuum tweezer port 1112, introduce the tip of the vacuum tweezers structure 1100 to the cap, and introduce fluid to the piston port 1118 to grab and lift the cap from the top of the sample container.

Figure 12C:
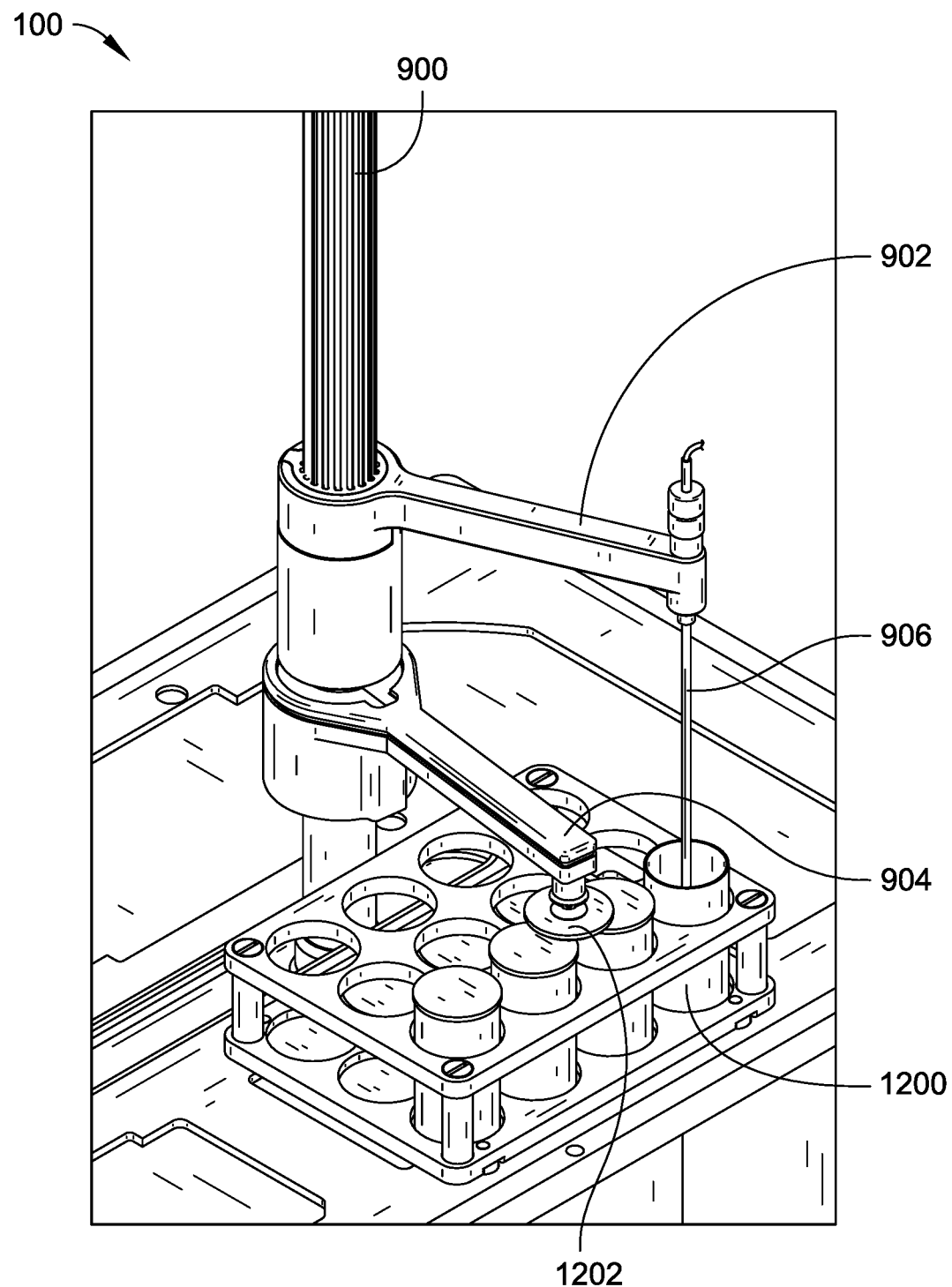
FIG. 12C is a side view of the autosampler system with the cover positioning tool moving the cover out of a vertical axis of the sample probe and with the sample probe introduced to the interior of the sample container.

The sample cap remover 904 is then rotated along the x-y plane to reposition the first cap 1202 while the first cap 1202 is held by the sample cap remover 904, as shown in FIG. 12C. For example, the z-axis support 900 rotates about the z-axis to reposition the end of the sample cap remover 904 while holding the first cap 1202 to move the first cap 1202 away from the first sample container 1200 to permit access by the sample probe 906. In implementations where the probe support arm 902 and the sample cap remover 904 are secured to a single z-axis support 900, rotational motion of the z-axis support 900 can simultaneously move each of the probe support arm 902 and the sample cap remover 904 along the x-y plane. For example, when the first cap 1202 is removed from the first sample container 1200, the z-axis support 900 can position the end of the probe support arm 902 over the open container to prepare to introduce the sample probe 906 to the fluid sample into the first sample container 1200.

Figure 12D:
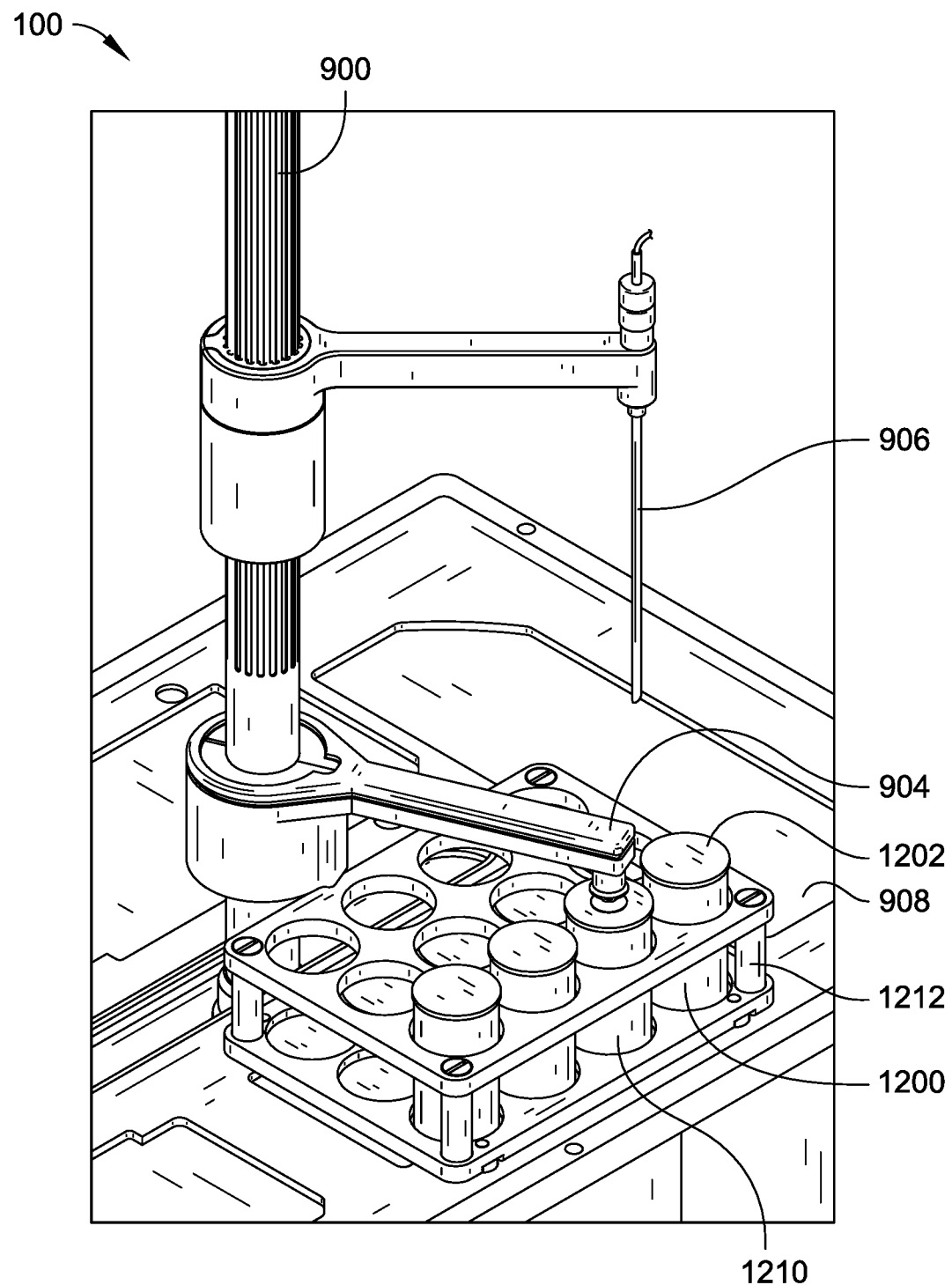
FIG. 12D is a side view of the autosampler system with the cover positioning tool positioned over a second covered sample container.

During the rotation of the z-axis support 900 to position the sample probe 906, the displacement between the sample cap remover 904 relative to the probe support arm 902 causes the sample cap remover 904 to be moved away from the first sample container 1200 to permit unimpeded access by the sample probe 906 for sample removal. For example, as shown in FIG. 12C, the sample cap remover 904 is positioned away from the first sample container 1200 and the probe support arm is moved vertically along the z-axis support 900 to introduce the sample probe 906 into the first sample container 1200. The sample probe 906 then draws a sample from the first sample container 1200 (e.g., via a vacuum acting on the sample probe 906, such as through a pump or other vacuum source) and is removed from the first sample container 1200 (e.g., via vertical motion of the probe support arm 902). The system 100 can optionally replace the first cap 1202 to the first sample container 1200 (or a sample cap depository location), such as by rotation of the z-axis support 900 and disengagement of the vacuum on the sample cap remover 904. The system 100 then positions the sample cap remover 904 over a second sample container 1210 to repeat the process for another sample, as shown in FIG. 12D. In implementations, the system 100 can include a sample rack 1212 raising a base of the sample containers a particular height above the deck 908, such as for short or small volume sample containers, to provide access to an underside of the sample containers (e.g., via a scanning device), or the like, or to otherwise hold the sample containers in position on the deck 908.

In implementations, the sample cap remover 904 could be substituted with, combined with, or provided in addition to another structure utilized to access the interior of the sample containers. For example, the system 100 can include a sample spiker that includes tubing or other fluid-handling structure to introduce a chemical to a sample at a particular time, such as a chemical configured to induce a chemical reaction with a sample at a known time before analyzing the sample.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An autosampler system comprising:
a z-axis support rotatable about a z-axis of an autosampler deck;
a sample probe support structure coupled to the z-axis support, the sample probe support structure configured to hold a sample probe to withdraw a fluid-containing sample held within a sample container supported by the autosampler deck; and
a sample cap remover coupled to the z-axis support, the sample cap remover including
a clamp portion configured to interface with an exterior surface of the z-axis support,
a cover portion configured to cover at least a portion of the clamp portion, and
a cap remover support arm extending from the cover portion, the cap remover support arm being rotationally offset from the sample probe support structure at an angle across an x-y plane,
wherein the sample cap remover is configured to lift a cap from the sample container to provide access to an interior of the sample container by the sample probe supported by the sample probe support structure.

2. The autosampler system of claim 1, wherein the sample cap remover includes a vacuum tweezers structure configured to remove the cap from the sample container via application of a vacuum to the vacuum tweezers structure.

3. The autosampler system of claim 2, wherein the sample cap remover defines a channel to receive a vacuum line through the sample cap remover to couple with a vacuum port of the vacuum tweezers structure.

4. The autosampler system of claim 1, wherein the cover portion rests on the clamp portion, and wherein the cover portion is vertically displaceable with respect to the clamp portion.

5. The autosampler system of claim 4, wherein the sample cap remover includes a piston configured to provide vertical displacement of the cover portion with respect to the clamp portion.

6. The autosampler system of claim 1, wherein the angle is from about 5 degrees to about 90 degrees.

7. The autosampler system of claim 1, further comprising:
an outer shuttle coupled with an outer surface of the z-axis support; and
an inner shuttle linearly moveable within an interior volume of the z-axis support, the inner shuttle magnetically coupled with the outer shuttle to translate linear motion of the inner shuttle to the outer shuttle,
wherein the sample probe support structure is coupled to the outer shuttle to translate linear motion of the outer shuttle to the sample probe support structure.

8. An autosampler system comprising:
a z-axis support rotatable about a z-axis of an autosampler deck;
a sample probe support structure coupled to the z-axis support, the sample probe support structure configured to hold a sample probe to withdraw a fluid-containing sample held within a sample container supported by the autosampler deck;
a sample cap remover coupled to the z-axis support in an orientation that is rotationally offset from the z-axis support with respect to the sample probe support structure, the sample cap remover configured to lift a cap from the sample container to provide access to an interior of the sample container by the sample probe supported by the sample probe support structure;
an outer shuttle coupled with an outer surface of the z-axis support; and
an inner shuttle linearly moveable within an interior volume of the z-axis support, the inner shuttle magnetically coupled with the outer shuttle to translate linear motion of the inner shuttle to the outer shuttle.

9. The autosampler system of claim 8, wherein the sample cap remover includes a vacuum tweezers structure configured to remove the cap from the sample container via application of a vacuum to the vacuum tweezers structure.

10. The autosampler system of claim 9, wherein the sample cap remover defines a channel to receive a vacuum line through the sample cap remover to couple with a vacuum port of the vacuum tweezers structure.

11. The autosampler system of claim 8, wherein each of the sample probe support structure and the sample cap remover are directly coupled to the z-axis support.

12. The autosampler system of claim 8, wherein the sample probe support structure is coupled to the outer shuttle to translate linear motion of the outer shuttle to the sample probe support structure.

13. An autosampler system comprising:
a z-axis support rotatable about a z-axis of an autosampler deck;
a sample probe support structure coupled to the z-axis support, the sample probe support structure configured to hold a sample probe to withdraw a fluid-containing sample held within a sample container supported by the autosampler deck; and
a sample cap remover coupled to the z-axis support in an orientation that is rotationally offset from the z-axis support with respect to the sample probe support structure, the sample cap remover configured to lift a cap from the sample container to provide access to an interior of the sample container by the sample probe supported by the sample probe support structure,
wherein the sample cap remover includes a clamp portion and a cover portion, wherein the clamp portion is configured to couple to the z-axis support, and wherein the cover portion covers at least a portion of the clamp portion.

14. The autosampler system of claim 13, wherein the cover portion rests on the clamp portion, and wherein the cover portion is vertically displaceable with respect to the clamp portion.

15. The autosampler system of claim 14, wherein the sample cap remover includes a piston configured to provide vertical displacement of the cover portion with respect to the clamp portion.

16. The autosampler system of claim 15, wherein the piston is a pneumatic piston having a piston port configured to couple with a fluid line to receive a fluid to provide the vertical displacement.

17. The autosampler system of claim 13, wherein the sample cap remover includes a cap remover support arm extending from the cover portion, and wherein the cap remover support arm is rotationally offset from the sample probe support structure at an angle across an x-y plane.

18. The autosampler system of claim 17, wherein the angle is from about 5 degrees to about 90 degrees.

19. The autosampler system of claim 17, wherein the angle is from about 10 degrees to about 35 degrees.

* * * * *